United States Patent
Neely, III et al.

(10) Patent No.: US 7,269,623 B2
(45) Date of Patent: Sep. 11, 2007

(54) SYSTEM AND METHOD FOR DISTRIBUTED MULTIMODAL COLLABORATION USING A TUPLE-SPACE

(75) Inventors: Howard E. Neely, III, Manhattan Beach, CA (US); Jason R. Fox, Thousand Oaks, CA (US); Peter A. Tinker, West Hills, CA (US); Jason J. Jerald, Chapel Hill, NC (US)

(73) Assignee: Raytheon Company, Waltham, MA (US)

( * ) Notice: Subject to any disclaimer, the term of this patent is extended or adjusted under 35 U.S.C. 154(b) by 768 days.

(21) Appl. No.: 10/339,265

(22) Filed: Jan. 9, 2003

(65) Prior Publication Data

US 2004/0139157 A1 Jul. 15, 2004

(51) Int. Cl.
*G06F 15/16* (2006.01)
(52) U.S. Cl. .................... 709/205; 709/204
(58) Field of Classification Search ............. 709/204, 709/205
See application file for complete search history.

(56) References Cited

U.S. PATENT DOCUMENTS

| | | | |
|---|---|---|---|
| 4,627,019 A * | 12/1986 | Ng | 707/8 |
| 4,710,926 A | 12/1987 | Brown et al. | |
| 5,551,035 A | 8/1996 | Arnold et al. | |
| 5,615,360 A | 3/1997 | Bezek et al. | |
| 5,892,946 A | 4/1999 | Woster et al. | |
| 5,913,038 A | 6/1999 | Griffiths | |
| 6,073,176 A | 6/2000 | Baindur et al. | |
| 6,182,276 B1 | 1/2001 | Brawn et al. | |
| 6,901,441 B2 * | 5/2005 | Bent et al. | 709/223 |
| 2004/0006614 A1 * | 1/2004 | DiFalco | 709/223 |
| 2004/0015642 A1 * | 1/2004 | Moir et al. | 711/1 |
| 2004/0031058 A1 * | 2/2004 | Reisman | 725/112 |

FOREIGN PATENT DOCUMENTS

WO   WO 01/3412 A1   1/2001

OTHER PUBLICATIONS

EPO Partial European Search Report dated Apr. 26, 2004.
K. Edwards, Core Jini, Java Series, Jun. 1999, pp. 657-672.
Edwards K, Core Jini, Core Jini, XX, pp. 635-656.
Pedro Garcia, Oriol Montala, Charles Pairot and Robert Rallo, Move: Component Groupware Foundations for Collaborative Virtual Environments, Oct. 2002, pp. 55-62.

(Continued)

*Primary Examiner*—Nathan Flynn
*Assistant Examiner*—Mohamed Wasel
(74) *Attorney, Agent, or Firm*—Daly, Crowley, Mofford & Durkee, LLP

(57) ABSTRACT

A distributed multimodal collaboration system includes at least one server coupled to a network, a plurality of data sources coupled to the network and a plurality of clients executing on a corresponding plurality of client workstations coupled to the network. The system further includes a tuple-space having a plurality of descriptors. The tuple-space is accessible by the plurality of data sources, and the plurality of clients, and a descriptor distribution and invalidation protocol is operative to distribute and invalidate descriptors accessible by the plurality of clients and the plurality of data sources, and the system includes a transaction processor for committing a plurality of transactions associated with the descriptor distribution and invalidation protocol.

12 Claims, 15 Drawing Sheets

OTHER PUBLICATIONS

Erik Gutmann, Service Location Protocol: Automatic Discovery of IP Network Services, Jul. 1999, pp. 71-80.
"JavaSpaces™ Service Specification," Version 1.1, Oct. 2000, © 2000 Sun Microsystems, Inc., 901 San Antonio Road, Palo Alto, CA 94303.
"Jini™ Technology Core Platform Specification," Version 1.2, Dec. 2001, © 2001 Sun Microsystems, Inc., 901 San Antonio Road, Palo Alto, CA 94303.
E. Freeman, S. Hupfer and K. Arnold, "JavaSpaces™ Principles, Patterns, and Practice," An imprint of Addison-Wesley Longman, Inc., © 1999 by Sun Microsystems, Inc., 901 San Antonio Road, Palo Alto, California 94303.
PCT Partial Search Report 46709.EP01, Nov. 5, 2004.
Reid G. Smith, The Contract Net Protocol: High-Level Communication and Control in a Distributed Problem Solver, Dec. 1980, pp. 1104-1113, vol. 20, No. 12, Canadian Crown Copyright.
Tain-Chi Lu, A Collaborative Scene Editor for VRML Worlds, 1998, vol. 17, No. 3, pp. C-53-C-62, Blackwell Publishers, Malden, Massachusetts.
Myeong Won Lee et al., An Interactive and Collaborative Virtual Reality Editing System, 2000, pp. 1-14, vol. 4, No. 2, Korea.
Hoa Wang et al., Collaborative and Interactive Room Design on the Web, Dec. 7, 2000, pp. 238-245.
Javaspaces (TM) Specification, Javaspaces Specification, Jul. 1998, pp. 1-29.

* cited by examiner

SYSTEM AND METHOD FOR DISTRIBUTED MULTIMODAL COLLABORATION USING A TUPLE-SPACE

CROSS-REFERENCE TO RELATED APPLICATIONS

Not applicable.

STATEMENTS REGARDING FEDERALLY SPONSORED RESEARCH

Not applicable.

FIELD OF THE INVENTION

This invention relates generally to systems for distributed collaborative interaction and more particularly to systems and techniques to transform, update and display shared multimedia data.

BACKGROUND OF THE INVENTION

In military and civil command center applications, it is often desirable to share multimedia data from numerous realtime and recorded sources among users having client systems (also referred to as clients) distributed over a network. In addition, these applications can benefit from a capability for spatial planning collaboration using a common network and service infrastructure, for example the public Internet, as the network fabric. These applications can also benefit from a system that efficiently maps multimedia data sources over the available capabilities of the client systems. Examples of these applications include emergency management and military command and control.

There are several challenges to implementing systems to support these command and control applications, including adaptation of the multimedia data to the capabilities of the various distributed platforms, management of information about the multimedia data, and distribution of spatial models for use in spatial planning collaboration. One of the challenges of Internet communication is transferring data amongst platforms of differing capabilities. The client system is generally the system receiving the multimedia data. The bandwidth, processing and display capabilities of the client system platform may not be sufficient to handle the data being sent by the source of multimedia data.

One conventional solution to this problem is the conversion of multimedia data including still images, audio, and video into different communications and display formats that require less bandwidth for delivery to the different platforms. In the case in which the same type of data can be handled by the receiving system, but not at the same bandwidth, resolution, color depth, etc., this conversion process is known as "transcoding." In the case in which the type of data that can be handled by the receiving system is different from the original data type, this conversion process is known as "modality transformation."

A modality transformation is the conversion of communication modalities (such as speech, text, and full motion video) into a different modality, for example speech-to-text. In most cases, modality transformations convert data of one modality type into data of a second type that requires less bandwidth or computational resources for transmission and display. The goal of the transformation is to provide client systems having limited resources access to the same information available to clients having greater resources. Often, there are several modality transformation services available to perform a modality transformation, and the client selects the service to use.

A distributed multimodal collaboration system should handle users joining and departing the collaboration session, at arbitrary times, data sources becoming available and unavailable at arbitrary times, and notification of new users joining the collaboration of original data sources and transformation data services available at that time. The readers (clients) of the multimedia data need to know when the data being delivered is no longer valid, for example, when a live video program has ended. The clients need to know when to shut down displays and to close data sources. The distributed multimodal collaboration system that provides a virtual environment for collaboration (also referred to as a collaborative virtual environment or CVE) should have the capability to distribute consistent models, including a model of the background scene (for example, terrain), models for objects to be manipulated in that scene, and transformations describing the location, orientation, and behavior of these objects and of the scene viewpoint. Generally, a session begins when a user begins to use the CVE, and other users join forming the collaboration. In some situations, a means to arbitrate simultaneous updates to the models from a hierarchy of users having different roles in the collaboration is required. CVE collaboration is described in, García et al.; "MOVE: Component Groupware Foundations for Collaborative Virtual Environments;" Proceedings of the 4th international conference on Collaborative virtual environments; 2002, pages 55-62.

It would, therefore, be desirable to provide a distributed multimodal collaboration system having a system of "descriptors" that can be passed to client systems to inform the clients of the availability of multimedia data and collaborative sessions, and a protocol for the distribution and invalidation of these descriptors via a reliable and flexible distributed communication system.

It would also be desirable to provide a protocol for the distribution of scene graph edits. It would also be further desirable to provide a marketplace-based protocol which provides the infrastructure whereby various distributed services assess their capability to perform a modality transformation and then bid for a contract to perform the transformation.

SUMMARY OF THE INVENTION

In accordance with the present invention, a distributed multimodal collaboration system includes at least one server coupled to a network, a plurality of data sources coupled to the network and a plurality of clients executing on a corresponding plurality of client workstations coupled to the network. The system further includes a tuple-space having a plurality of descriptors. The tuple-space is accessible by the plurality of data sources and the plurality of clients, and a descriptor distribution and invalidation protocol is operative to distribute and invalidate descriptors accessible by the plurality of clients and the plurality of data sources, and the system a transaction processor for committing a plurality of transactions associated with the descriptor distribution and invalidation protocol.

With such an arrangement, descriptors are passed to clients to inform them of the availability of multimedia data and collaborative sessions, and these descriptors are invalidated via a reliable and flexible distributed communication system. New users and command center stations or terminals interconnect without detailed knowledge of the network architecture by using conventional resource discovery protocols and a communication architecture combined with protocols for the distributed invalidation of objects in a shared tuple-space and for the distribution of media descriptors.

In accordance with another aspect of the present invention, a distributed multimodal collaboration system includes at least one server coupled to a network having at least one modality transformation service, a plurality of data sources coupled to the network, a plurality of clients coupled to the network, a tuple-space having a plurality of descriptor objects. The tuple-space is distributed between the at least one server and the plurality of clients, and a modality transformation negotiation protocol is operative among the at least one modality transformation service and the plurality of clients. Such an arrangement provides a marketplace model protocol built on the tuple-space for implementing an economic model for selecting media transformation services which operate on multimedia data in the tuple-space. In one embodiment, the marketplace model protocol uses a fault-tolerant "anti-barrier" synchronization system.

In accordance with another aspect of the present invention, a method for providing consistent models to generate a scene in a collaborative virtual environment (CVE) includes segmenting the scene into a plurality of scene graph edits, writing scene graph edits to a request channel and arbitrating scene graph edits based on a role of a requester, and a current mission context. The method further includes authorizing each scene graph edit in response to the role of the requester and the current mission context, and writing the authorized scene graph edits to a grant channel.

Such a technique provides a protocol for the distribution of scene graph edits. Such a technique also provides a process to manage scene graph edit updates from several sources and allows the updates to be distributed to a collaboration of users. Such an arrangement further provides the capability to either augment an existing command center with additional low-cost stations, or build an entire command center using low-cost compact equipment, such as laptop computers.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
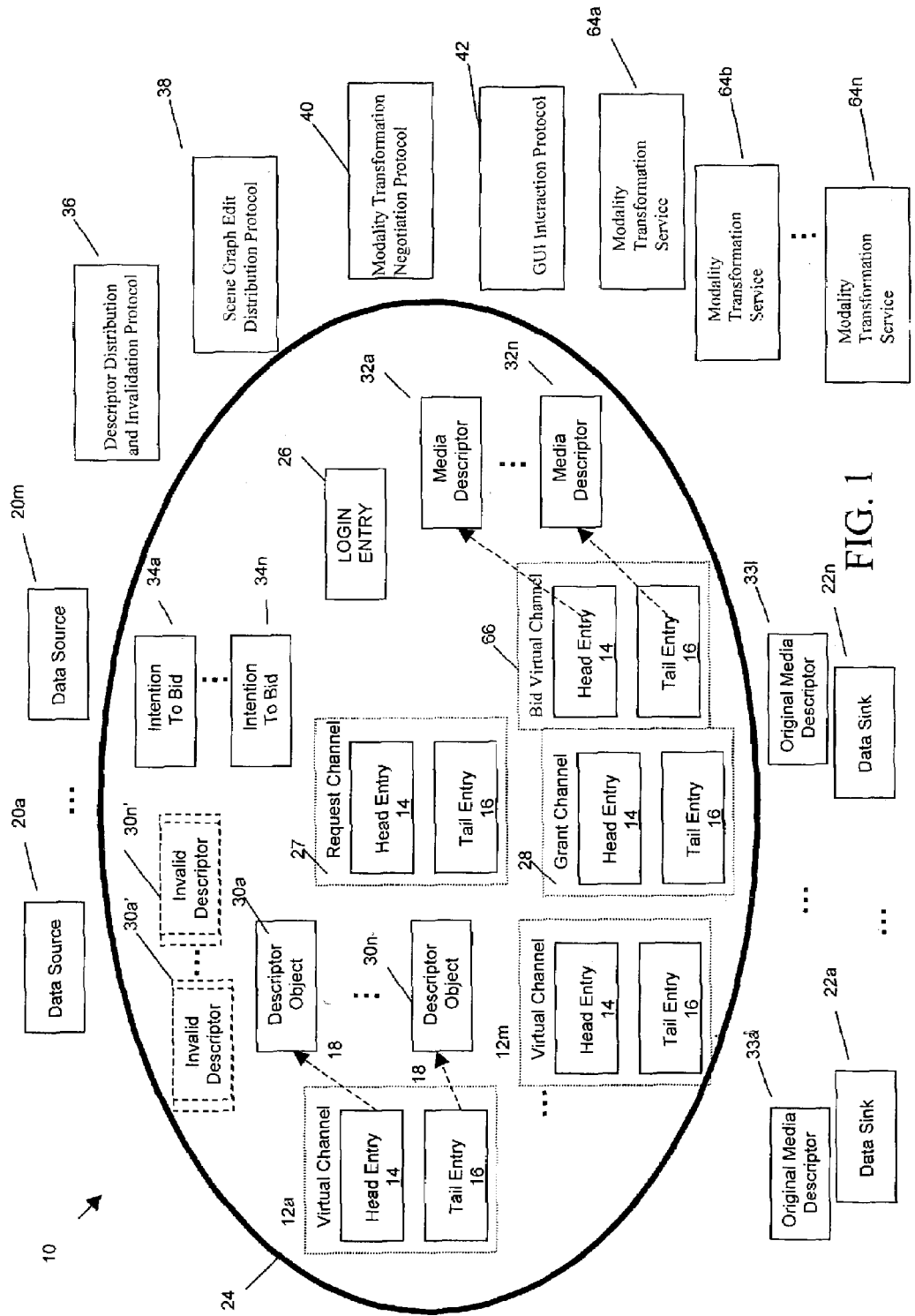
FIG. 1 is a schematic diagram of a tuple-space including descriptor objects according to the invention.

Before providing a detailed description of the invention, it may be helpful to review the state of the art of tuple-spaces and distributed object systems. One such distributed object system modeled on tuple-spaces is JavaSpaces™, a distributed object system developed and trademarked by Sun Microsystems Inc. (SUN). "JavaSpaces™ Service Specification Version 1.1," published October 2000 by SUN provides details of JavaSpace services, operations and transactions. The JavaSpace services efficiently handle the task of distributed, consistent object communication by providing associative access to serialized representations of objects, using the following operations (and referenced below in upper case):

1) WRITE. Write an object into the tuple-space, possibly under a transaction, providing an initial lease time (may be infinite) request. The WRITE invocation returns a lease object. The lease object controls the length of time that the written object remains in the JavaSpace. The JavaSpace will generally return a lease that is valid for the requested initial lease time. When a lease expires, the JavaSpace server removes the object from the space. Leases may be renewed at any time. An infinite lease never expires. Leases are described in the SUN Jini™ Technology Core Platform Specification, pages 35-47.

2) READ. Read a copy of the object from the tuple-space that matches a supplied template, possibly under a transaction, waiting for a specified duration. If the duration expires, return with a null value.

3) READIFEXISTS. Read a copy of the object from the tuple-space that matches a supplied template. If not under a transaction, return immediately with a null value if the object does not exist in the space. If under a transaction, wait the specified time for the object to clear any ongoing transaction. If the timeout value is exceeded, return a null value.

4) TAKE. Read a copy of the object from the tuple-space that matches the supplied template, possibly under a transaction, and then remove that object from the tuple-space. If a matching instance is not immediately available, wait the timeout duration, then return null if the object is still unavailable.

5) TAKEIFEXISTS. Read an instance of an object that matches the supplied template and remove the instance from the tuple-space. If under a transaction (i.e. the transaction has not been committed) and a matching instance is not available, block until an instance becomes available and return with the object, or return null if the timeout duration is reached. If not under a transaction and a matching instance is not immediately available, return with a null value.

6) NOTIFY. Throw a Remote Exception if an object instance is written to the tuple-space that matches a supplied template.

It should be noted that, in JavaSpaces™, a transaction has a special meaning. It is a condition under which the atomicity and consistency of a set of operations on the space is assured. Errors that occur within a transaction, or failure to commit the transaction, result in no change to the space, as if the transaction had never been attempted. Transactions are described in SUN Jini™ Technology Core Platform Specification, pages 83-88 and 105-112.

For the operations described above, matching requires that object instances exactly match the non-null fields in the object or its superclasses. This is the associative access property. Each object instance, called an Entry in JavaSpaces™, has one or more public data fields. In JavaSpaces™, the fields have to be Java objects, which means that the value in the field is an object reference (pointer). Object references can either point to a valid object, or can be "null." Templates in JavaSpaces™ are objects of the same type as those that are to be read from the tuple-space, with field values set to find a match in the space. Null field values are treated as logical "don't care" values. If a template is used with all null fields, only the type will be matched in the space. However, if any of the fields are non-null, then the object returned must have exactly the same value in these non-null fields as the template. This also applies to fields at higher levels of the class hierarchy (superclasses). Being "under a transaction" means that the separate operations are grouped into an atomic, consistent set: either all occur or none occur. Both the READIFEXISTS and TAKEIFEXISTS operations can "see inside" the transaction to know that the object does exist, and that they should wait their timeout value for the transaction to complete before returning with a null value. Transactions are completed by committing, aborting, or timing out. Java, Jini™, Java Virtual Machine (JVM) and JavaSpaces™ are SUN software technologies.

As used herein, the term "display" refers to forms of information presentation to the human user, including but not limited to, image and video for visual display, speakers for audio display, haptic (i.e. based on the sense of touch) interfaces for haptic display. For example, the original form of the multimedia data may be speech audio, and the receiving end may not have an available audio output channel at the time so the speech audio is displayed as text.

For purposes of the present invention, as used herein the term "modality" refers to media information acquired by one of the senses. The term "modality transformation" refers to a transformation that preserves some of the original media's meaning. Note that two different media formats alone do not signify different modalities. For example, mp3 and wav formats are different audio formats, but both represent the same modality. Audio and video can be distinguished as two different modalities, and "speech" can be classified as a modality distinct from "audio."

As used herein, the term "tuple-space" refers to an entry-based shared memory that stores collections of information for future computation, and is driven by value-based ("associative") access. The tuple-space enforces mutually-exclusive operations on entries in the space, and supports atomic grouping of operations through transactions. READ, WRITE, TAKE, READ-IF-EXISTS, TAKE-IF-EXISTS, and NOTIFY are the primary operations on the tuple-space, as described above. The term "entry" refers to a typed group of objects which include zero or more typed fields. Objects can be written into the tuple-space, and objects in the tuple-space are accessed by the type of the entry and the values of zero or more of the fields. Fields not specified ("null fields") do not affect selection.

The term "protocol," as used herein, refers to the specific details and means by which clients, services, and data sources communicate amongst themselves to achieve a desired outcome (for example, invalidation of a descriptor). Protocols are implemented by operations on entries in the tuple-space, such as WRITING an entry to the space; TAKING, modifying values, then WRITING the entry back to the tuple-space, for example. Each protocol comprises two or more sub-processes, for example one executing as part of a service and the other executing as part of a client or a data source.

As used herein, the term "client" refers to a process or set of processes initiated by a user who is participating in the distributed collaboration. It is understood that the client processes and the protocol processes can execute on a variety of known computers and workstations running various operating systems, such as UNIX and Windows. In one embodiment, the clients and the protocol processes are implemented using the Java programming language running in a Windows environment. The blocks denoted "protocol," "data source," "data sink," "service," "client" and "manager" can represent computer software instructions or groups of instructions. Such processing may be performed by a single processing apparatus which may, for example, be provided as part of a server, a laptop computer, a mobile device, or distributed over several processing devices.

Although, in the embodiments and examples described below, the interprocessor data communications and tuple-space are implemented using the Jini™-based JavaSpace service infrastructure, it will be appreciated by those of ordinary skill in the art that the inventive system can be implemented with other infrastructures which provide services and basic operations similar to those provided by the Jini™-based JavaSpace services.

Referring now to FIG. 1, a distributed collaborative interaction system 10 includes a plurality of data sources 20a-20m (generally referred to as data sources 20) and a plurality of data sinks 22a-22n (generally referred to as data sinks 22) which are connected to a tuple-space 24. The tuple-space 24 has a plurality of virtual channels 12a-12m (generally referred to as virtual channels 12) each having a head entry 14 and a tail entry 16. The tuple-space 24 further includes a plurality of descriptors 30a to 30n (also referred to as descriptor objects 30) and can include one or more invalid descriptors 30a'. The head entry 14 and the tail entry 16 each include an index (described in detail in conjunction with FIG. 4) corresponding to one of the plurality of descriptors 30 when the virtual channel 12 is not empty.

The tuple-space 24 further includes a request channel 27, a grant channel 28, and a bid virtual channel 66 each having a head entry 14 and a tail entry 16, a plurality of media descriptor objects 32a-32n (generally referred to as media descriptor objects 32), a login entry 26, and a plurality of intention to bid objects 34a-34n (generally referred to as intention to bid objects 34). The media descriptor objects 32a-32n are subclasses of descriptors objects 30a-30n initialized for use by a Modality Transformation Negotiation Protocol 40. The descriptors 30a to 30n and the media descriptor objects 32 are collectively referred to as descriptors 30, 32. The virtual channels 12 and the bid virtual channels 66 are collectively referred to as virtual channels 12, 66.

The bid virtual channel 66 is similar in structure to the virtual channel 12. The intention to bid objects 34 are WRITTEN to the tuple-space 24 (but are not directly coupled to the bid virtual channels 66) by a plurality of modality transformation services 64a-64n in response to READING a media descriptor object 32 that has been placed in the bid virtual channel 66.

The distributed collaborative interaction system 10 further includes a plurality of original media descriptors 33a-33l (generally referred to as original media descriptor 33). Each of the plurality of original media descriptors 33 is the media descriptor 32 that the client READ from the virtual channel 12 and discovered that a modality transformation was required before the media descriptor 32 is used. The distributed collaborative interaction system 10 further includes a Descriptor Distribution and Invalidation Protocol 36, a Scene Graph Edit Distribution Protocol 38, the Modality Transformation Negotiation Protocol 40, a graphical user interface (GUI) Interaction Protocol 42, and the plurality of modality transformation services 64a-64n. The protocols 36-42 and the plurality of modality transformation services 64a-64n (generally referred to as transformation services 64), include processes which communicate with the data sources 20 and data sinks 22 through manipulation of the objects including the login entry 26, the request channel 27, the grant channel 28, the media descriptor objects 32 accessed through the virtual channels 12, and the intention to bid objects 34 using the bid virtual channel 66 in the tuple-space 24. It should be noted that other objects that are instances of the subclass of the descriptor objects 30 can be managed by the virtual channels 12, and other objects that are instances of the subclass of media descriptor objects 32 can be managed using the Modality Transformation Negotiation Protocol 40. It is understood that the subclasses (i.e., media descriptor objects 32) are initialized, not the descriptors 30 and that the protocols 36-42 that are used with descriptors 30 can also be used with media descriptors 32.

In operation, the head entry 14 and tail entry 16, one pair per virtual channel 12, are TAKEN, modified, and then WRITTEN back to the tuple-space 24. The tuple-space 24 is initialized to include one head entry 14 and one tail entry 16 for each virtual channel 12. When data becomes available to data sources 20a-20n, the media descriptor object 32 is added to one of the virtual channels 12. The media descriptor 32 is a subclass of the descriptor object 30 and includes fields that are initialized for describing various media. The data sinks 22 can join the distributed system at almost any time by READING the descriptors 30 associated with a virtual channel 12.

The Descriptor Distribution and Invalidation protocol 36 (described in detail in conjunction with FIGS. 6 and 7) assures that each user (e.g., the client, services and the protocol processes) of the descriptors 30, 32 accesses one and only one copy of each descriptor 30, 32, regardless of when the client accesses the tuple-space 24. The Descriptor Distribution and Invalidation protocol 36 provides access to active descriptors 30, 32 to new users. The Descriptor Distribution and Invalidation protocol 36 informs users (i.e., clients, services 64, data sources 20, and data sinks 22) about the invalidation of the descriptors 30, 32. In addition, Descriptor Distribution and Invalidation protocol 36 informs each user that holds a copy of invalidated descriptor objects 30' about the invalidation, and prevents new users from receiving invalid descriptor objects 30'.

The Descriptor Distribution and Invalidation Protocol 36 invalidates the media descriptor 32 when the media described by the metadata included in a description field (described in conjunction with FIG. 4) of the media descriptor object 32 is no longer available. The Descriptor Distribution and Invalidation Protocol 36 manages perishable session and media descriptor objects 32 on the tuple-space 24. Over time, the media described by the media descriptor object 32 may become invalid, e.g., if the media descriptor object 32 held information about a live media stream, that media descriptor object 32 is made invalid (i.e., becomes an invalid descriptor objects 30') when the live stream has ended. For example, if the media was a live CNN report, then the metadata for that live report becomes invalid when the report is finished. It should be noted, that a new media descriptor object 32 describing a recording of the CNN report would get a new media descriptor object 32.

When a graphical collaboration environment is used, the protocols 36-42 provide users with the capability to access information required to build a scene. The geometric and appearance scene data, including texture maps and affine transformations, are represented in a scene graph. Each data sink 22 participating in the graphical collaboration maintains a local copy of this scene graph, flowed to it a node at a time through the distributed collaborative interaction system 10. Although, in general, any data source 20, data sink 22, or service 64 can source the scene graph edits, this would typically be done by the data source 20 or service 64 designated for this purpose. The scene graph is changed by flowing a scene graph node with updated data, such as a translation transformation, through the collaborative interaction system 10 to each of the users. The Scene Graph Edit Distribution Protocol 38 (described in detail in conjunction with FIG. 8) assures that each user accesses one and only one copy of each scene graph edit. The Scene Graph Edit Distribution Protocol 38 provides sessions for the distribution of scene graph edits and provides distribution of a scene graph and consistent three-dimensional (3D) models, with role-based arbitration and interlocks, using the tuple-space 24. The Modality Transformation Negotiation Protocol 40 is a marketplace-based protocol which provides the infrastructure whereby various distributed modality transformation services 64 assess their capability to perform a modality transformation, and then bid for the "contract" for performing the transformation. The contract is an agreement between the modality transformation service 64 and the data sink 22 (i.e., the client) for the modality transformation service 64 to provide modality transformation according to a set of requested parameters. The Modality Transformation Negotiation Protocol 40 provides a means for efficiently selecting from a plurality of modality transformation services 64 using the tuple-space 24.

The GUI Interaction Protocol 42 (described in detail in conjunction with FIG. 10) is a user-centered protocol for role-specific interaction among users who want to communicate via various media and though various collaborative sessions. The GUI provides presentation of information availability prioritized based on each user's role in the current mission, preferences, and stated interests. Although every user has access to information in the tuple-space 24, based on their roles, some information may be more important to users in some roles. The GUI Interaction Protocol 42 assures that information is presented to each user in prioritized order, based on that user's role.

In the distributed collaborative interaction system 10, several services 64 (also referred to as service resources 64) are available to handle modality transformation. However, generally, not every service will be available all of the time, and not every service will be able to handle each required transformation. The Modality Transformation Negotiation Protocol 40 (described in detail in conjunction with FIGS. 9-9D) handles the matching of modality transformation needs with modality transformation services 64 using the tuple-space 24.

In operation, a new user can join the collaboration at any time and may have multimedia data bandwidths that differ from other users and the data sources 20. The data sources 20 and modality transformation services 64 need to detect when users enter and leave the collaboration. There is a requirement that the data sink 22, i.e., the consumer of the multimedia data, know when the data stream is invalid.

The modality transformation services 64 convert one stream of data to another, for example, a service 64 can convert a high data rate video stream to a lower data rate video stream. In another example, a service 64 can convert an audio data stream to a text data stream. These conversions would be required if one of the client computing platforms was, for example, a personal digital assistant (PDA) with a relatively low bandwidth.

The Modality Transformation Negotiation Protocol 40 is implemented through communication between the plurality of data sinks 22a-22n, the plurality of Modality Transformation Services 64a-64n, the plurality of media descriptor objects 32a-32n, the plurality of data sources 20a-20m, the plurality of intention to bid objects 34 and the bid virtual channel 66. The data sinks 22 are generally displays (e.g., a color monitor display).

Figure 2:
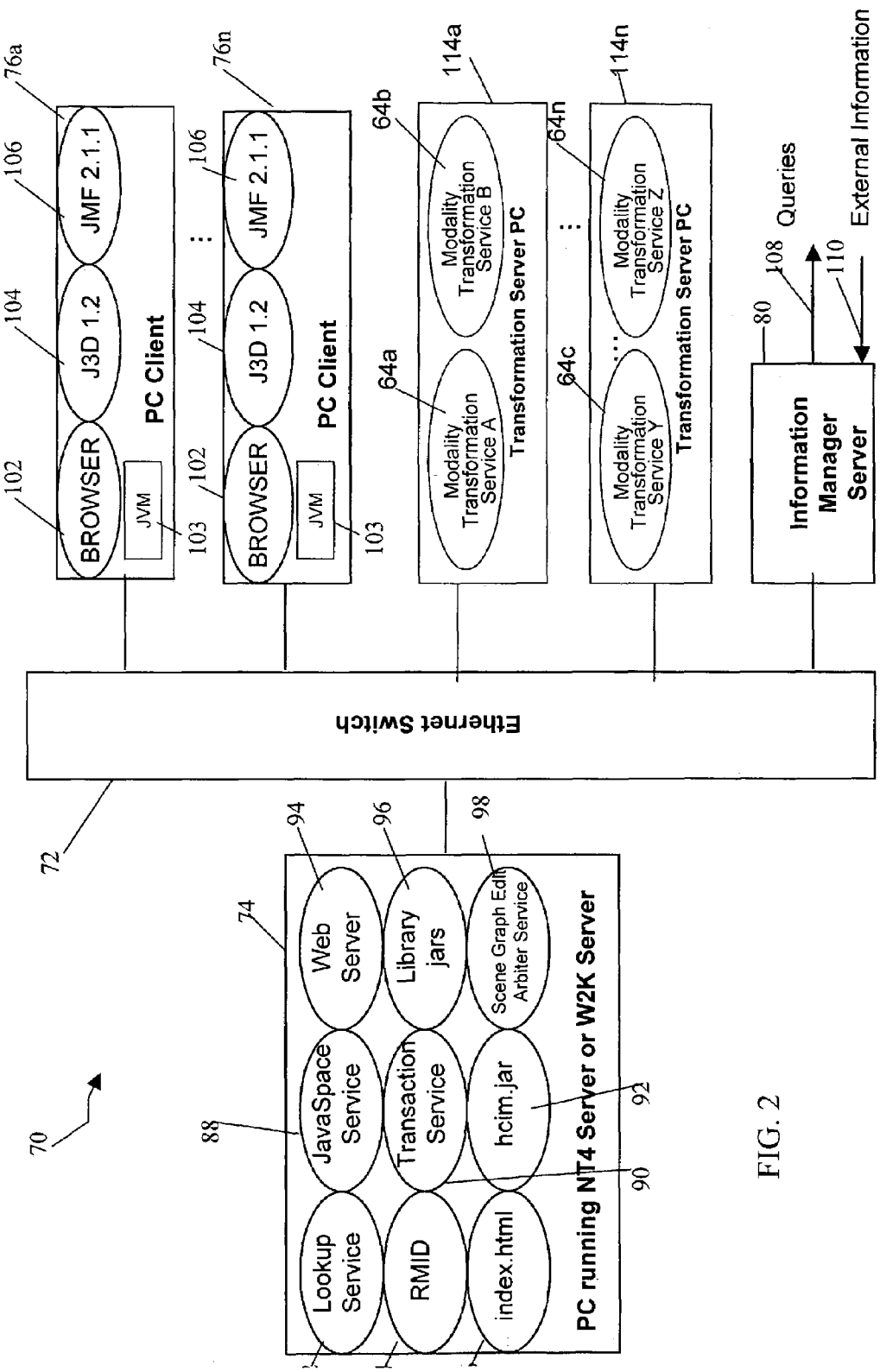
FIG. 2 is a block diagram of an exemplary command center according to the invention.

Now referring to FIG. 2, an exemplary command center 70 includes a network switch 72, a server 74, a plurality of client computing platforms 76a-76n (also referred to as client workstations 76), here for example, laptop computers, a plurality of transformation server computing platforms 114a-114n (generally referred to as transformation servers 114), and an Information Manager Server 80. The client processes generally execute on the client workstations 76. It will be appreciated the command center 70 can be provided as a mobile command center.

In one embodiment, the client workstations 76 include a browser 102, for example Netscape 6, and Java support modules 104, 106 for rendering various types of media. A Java Virtual Machine (JVM) 103 in the browser 102 is the primary platform for "client-side" execution of the protocols 36-42 (FIG. 1). The server 74 includes a lookup service 82, a Remote Method Invocation (RMI) daemon 84, an index.html file 86, a JavaSpace service 88, a transaction service 90, a human computer interaction manager (HCIM) Java archive (JAR) file 92, a web server 94, various support library JAR files 96, and a scene graph edit arbiter service 98. The lookup service 82, RMI daemon 84, and JavaSpace service 88 are standard components of a JavaSpaces™ system. The transaction service 90 is an optional JavaSpaces™ service that provides atomic, consistent, isolated, and dependable (ACID) transaction services that are used by the distributed collaborative interaction system 10 protocols 36-42. The index.html file 86 is the file, encoded in Hypertext Markup Language (HTML), that is initially read and rendered by the browser, and that causes download of the JAR files and launch of the HCIM client Java applet from Java bytecodes stored in the hcim.jar JAR file 92. In the command center 70 of FIG. 2, this applet is a WorkstationClient applet. The Web Server 94 is any web server capable of executing the Hypertext Transport Protocol (HTTP) GET command. Library JARs 96 include, for example, the Java 3D archive, the Java Media Framework (JMF) archive, the Simple API for XML (SAX) Extensible Markup Language (XML) parsing archive. The Scene Graph Edit Arbiter Service 98 is a server-side component of the HCIM that manages establishment of sessions for 3D collaborative environments using the tuple-space 24. The server 74 supports the execution of the protocols by distributing code to the clients workstations 76 and implementing the tuple-space 24 with transaction services used by the protocols 36-42.

The transformation servers 114 include one or more of the modality transformation services 64 of FIG. 1. The transformation servers 114 provide computational and communication resources for the one or more modality transformation services 64. The transformation servers 114 are the primary platforms for the "server-side" execution of the protocols including the Modality Transformation Negotiation Protocol 40.

The Information Manager Server 80 includes modules to generate information source queries 108 and modules to receive external information 110 in response to the queries 108. The system for distributed collaborative interaction 10 uses a variety of information types, including audio, video and 3D virtual environments. In the example of FIG. 2, the exemplary command center 70 uses commodity personal computers and web browsers.

In operation, the Information Manager (IM) Server 80 retrieves information from external sources (not shown). The IM Server 80 provides secure access to tactical and strategic information. In the command center 70 supported by JavaSpaces™, the displays run in the browser's JVM 103. Generally, the browser's JVM 103 spawns additional display windows (outside of the browser) for actual visual displays. Since execution is established by the current page loaded in the browser 102, and the current page will be the index.html file discussed above. In general, nothing else runs in the browser 102. While this is beneficial for efficiency, limiting the browser operation is optional. The Web Server 94 provides the JARs needed at the clients workstations 76. The RMI Daemon 84 provides the communication for the JavaSpace. The Transaction Service 90 allows operations that are not part of the core JavaSpaces™ API. A known lookup service (not shown) allows the clients to find the server.

The tuple-space 24, here implemented as a JavaSpace, is used as the shared object space to support the Descriptor Distribution and Invalidation Protocol 36, the Scene Graph Edit Distribution Protocol 38, the Modality Transformation Negotiation Protocol 40 and the GUI Interaction Protocol 42. The protocols 36-42, operate in a client-server arrangement through the tuple-space 24. In one embodiment, the client workstations 76 execute Java code on the JVM 103 in the web browser 102. The protocols 36-42 in conjunction with the command center 70 provide a platform for a multimedia, multimodal situational awareness user interface.

In one embodiment, the human computer interface manager (HCIM) jar 92 uses the set of services 64 that allow multimodal computer-mediated interaction between various types of clients. These services 64 are accessed, here via the Java 2-capable web browser 102. Several clients are defined for the HCIM, for example the Workstation Client. In this embodiment, the Workstation Client is implemented as a Java class WorkstationClient.

The WorkstationClient class is designed to be executable either as an applet or as an application program. A "Start," method executes as either an applet or an application, and calls are made to get proxy references to the JavaSpace using SpaceAccessor.getSpace( ) and to the TransactionManager (txmgr) using TransactionManagerAccessor.getManager( ). These references are passed to subsequent classes that use the JavaSpace. The SpaceAccessor class and the TransactionManager class are standard components of the JavaSpaces™ implementation from SUN. These classes hide the Jini™ and RMI details needed to establish references (instance pointers) that are used for remote method calls on the JavaSpace and a transaction manager that works in conjunction with the JavaSpace to provide atomic, consistent, isolated, and dependable (ACID) transaction services that are required by the distributed collaborative interaction system 10 protocols 36-42.

It is noted, that much of the operation in the distributed collaborative interaction system 10 occurs in response to events. In Java, this means that the action occurs in classes that implement the ActionListener interface. In the WorkstationClass, the process begins when the user presses the "Submit" button for example. This event causes execution of method actionPerformed in class SubmitListener, which results in generation of an instance, activation, and display of class MainWorkstationFrame as follows:

Class MainWorkstationFrame generates an instance of class MainList, generates an instance of class DescriptorManager (passing a reference to the instance of MainList), and does some other GUI housekeeping as is known in the art. The client-side part of the Descriptor Distribution and Invalidation Protocol 36 is implemented in the DescriptorManager.

Class MainList manages the list of DescriptorEntry objects, and allows the user to "play" the media described by the DescriptorEntry metadata. A long window, for example, on the left side of a display (not shown) provides user interaction with the role-prioritized list generated by the GUI Interaction Protocol 42.

Class DescriptorEntry is the root class of a class hierarchy of descriptors 30, 32 for the exchange of metadata, which are the principal objects manipulated by the Descriptor Distribution and Invalidation Protocol 36. Class DescriptorManager implements the client-side part of the Descriptor Distribution and Invalidation Protocol 36. The server side is implemented in class DescriptorUtilities. Two threads of execution run in the DescriptorManager: the main thread that looks for new additions to the ordered list and one in private class DescriptorInvalidationHandler that looks for invalidations. Class DescriptorUtilities includes methods for the insertion and invalidation of DescriptorEntry objects, descriptors 30, 32, but also runs threads to handle invalidations from other sources.

Figure 3:
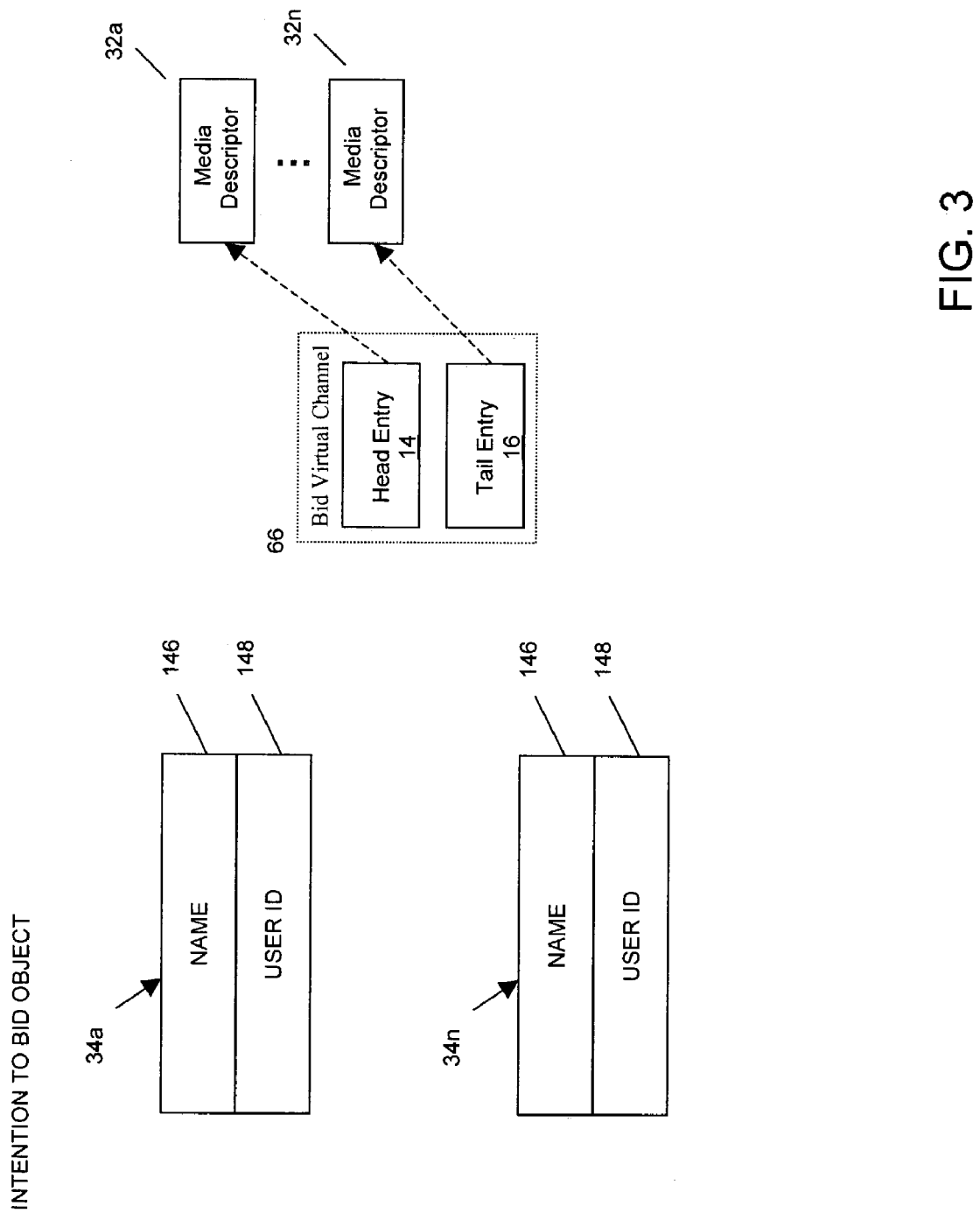
FIG. 3 is a schematic block diagram of an intention to bid object and a bid virtual channel according to the invention.

Now referring to FIG. 3, a plurality of intention to bid objects 34a-34n each includes a name 146 and a user id 148 field which are used during the Modality Transformation Negotiation Protocol 40 bidding process. The Bid virtual channel 66 (FIG. 1) includes a head entry 14 and a tail entry 16 which reference Media Descriptors 32, the plurality of intention to bid objects 34a-34n are not coupled directly to the Bid virtual channel 66.

Figure 4:
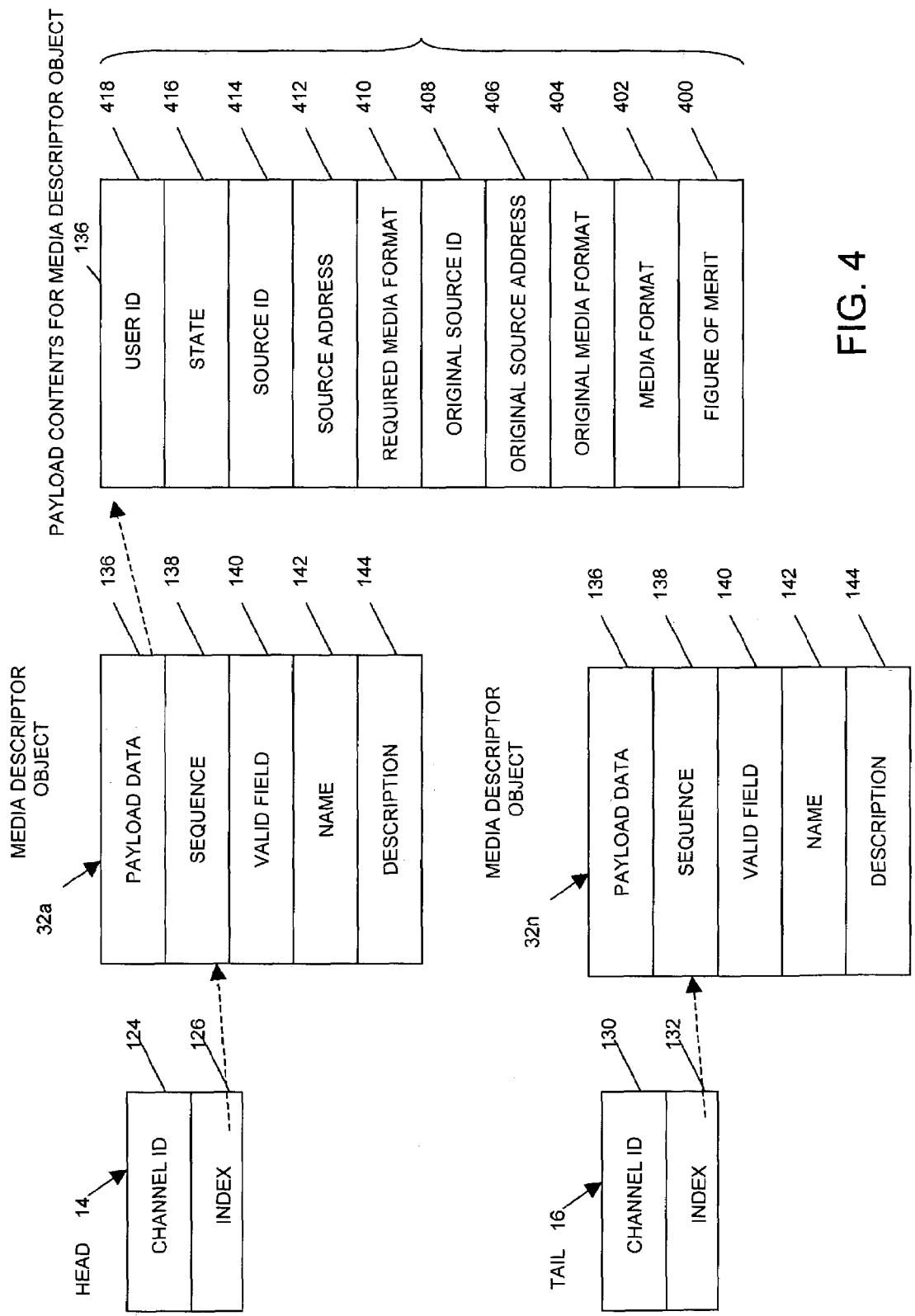
FIG. 4 is a schematic block diagram of the data structure of a chain of the media descriptor objects of FIG. 1.

Now referring to FIG. 4 in which like reference numbers indicate like elements of FIG. 1, the plurality of media descriptor objects 32 each includes a payload data field 136, a sequence field 138 (also referred to as a position field 138), a valid field 140, a name field 142 and a description field 144. The payload data 136 includes a figure of merit 400, a media format 402, an original media format 404, an original source address 406, an original source ID 408, a required media format 410, a source address 412, a source ID 414, a state field 416, and user ID 418. The head 14 (also referred to as head entry 14) includes a channel ID 124 and an index 126. The value of the index 126 corresponds to the sequence field 138 of one of the plurality of the media descriptors 32. The tail 16 (also referred to as tail entry 16) includes a channel ID 130 and an index 132. The value of the index 132 corresponds to the sequence field 138 of one of the plurality of the media descriptors 32.

The Descriptor Distribution and Invalidation Protocol 36 (FIG. 1) operates on a virtual channel 12 with a "take-the-hindmost" approach to invalidation by moving the expired invalid descriptor object 30' to the end of the virtual channels 12, 66 (as described below in conjunction with FIG. 6). Three sets of data objects are used: the head entry 14, the tail entry 16, and the plurality of descriptors 30, 32. In one embodiment, the sequence field 138 is an Integer-typed position field and establishes the descriptor object's 30 sequence order in the structure, and the valid field 140 is a Boolean-typed field. To initialize the data structure, one head 14 and one tail 16 are written to the tuple-space 24 (FIG. 1), each with an index 126 value of zero. Either the transformation service 64 (FIG. 1), a service operating for the transformation services 64, or a client can initialize the data structure. Data is accessed associatively, i.e., by content. The head entry 14 does not actually point to the descriptor object 30. The head entry 14, actually describes the descriptor object 30 by content of the sequence 138 field.

The correspondence between the virtual channel 12 (FIG. 1) and the head entry 14 and the tail entry 16 is established at initialization by setting the channel ID field 124 of the head entry 14 and the channel ID field 130 of the tail entry 16 to the same, system-unique integer or equivalent string value and the two Index fields (126 and 132) to zero. Each head entry 14 and tail entry 16 pair form the control structures for each virtual channel 12, 66 operating as a channel-based queue.

In the flow diagrams of FIGS. 5-10, the rectangular elements are herein denoted "processing blocks" (typified by element 152 in FIG. 5) and represent computer software instructions or groups of instructions. The diamond shaped elements in the flow diagrams are herein denoted "decision blocks" (typified by element 166 in FIG. 5A) and represent computer software instructions or groups of instructions which affect the operation of the processing blocks. Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

In the flow diagrams of FIGS. 5-10 and the description below, references to the operations designated as "TAKE," "READ," AND "WRITE" represent basic operations which manipulate objects in the tuple-space 24, here, a JavaSpace. It will be appreciated by those of ordinary skill in the art that other embodiments can implement these basic operations in a variety of programming languages and tuple-space models.

In one embodiment described below in conjunction with FIGS. 5-7, the Descriptor Distribution and Invalidation Protocol is implemented on the tuple-space 24 following the JavaSpace rules described above, to manage descriptors 30, 32. The following operational features are provided by the protocol: (1) multiple applications (clients and services 64) may WRITE valid descriptors 30, 32 (FIG. 4) at any time, in addition to the descriptor objects 30 written by data sources 20; (2) each client is constrained to READ one and only one copy of each valid descriptor 30, 32, even if the client joins the session late; (3) the data described by the descriptors 30, 32 can "expire" at any time, and the descriptors 30, 32 including the expired metadata can be invalidated in a way so that every client that holds it has time to correctly dispose of it and no late arriving client gets a copy of an invalid descriptor 30'; and (4) invalidated descriptors 30' are then eventually reclaimed so that they don't clutter the space.

Figure 5:
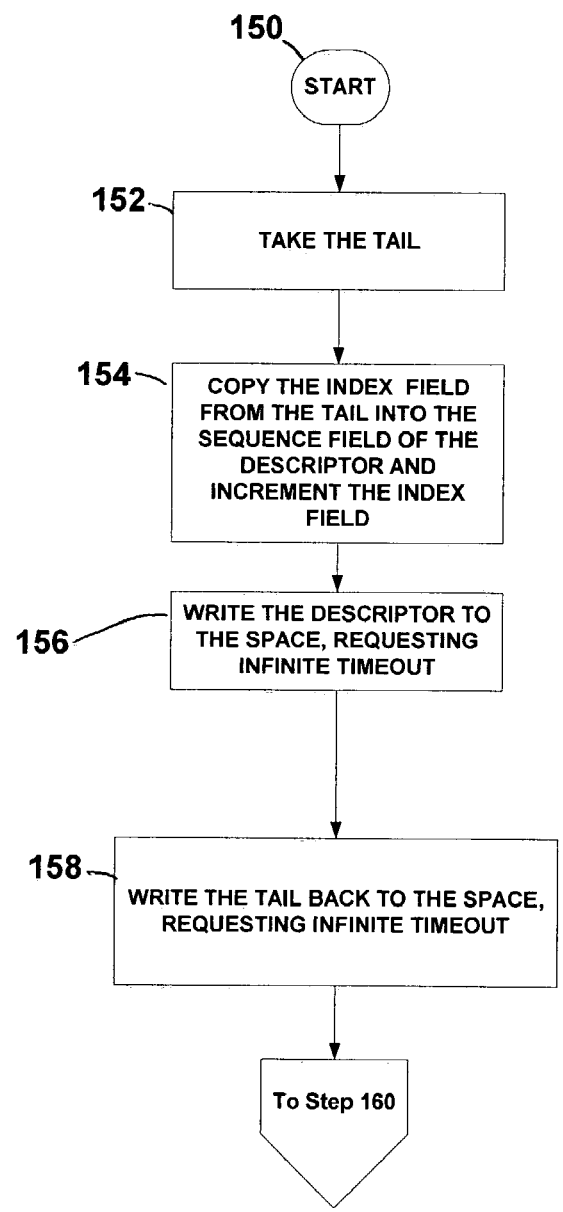
FIG. 5 is a flow diagram of the process used to WRITE descriptors into a virtual channel in a tuple-space according to the invention.

Now referring to FIG. 5, a flow diagram illustrates a process for writing new descriptors 30, 32 to the virtual channels 12, 66 in the tuple-space 24. The process of writing new descriptors 30, 32 to tuple-space 24 allows information to be shared among clients and servers, and streams of media data to be delivered from the data sources 20 to data sinks 22. The process commences in step 150, following which the process TAKEs the tail 16 of the virtual channel 12 in step 152. The process continues in step 154, where the process copies the index field 132 from the tail 16 into the sequence field 138 of the descriptor 30, 32 having a corresponding index field 132 value (only one descriptor is allowed to have a given sequence/index value) and then increments the value of the index field 132 in the tail 16. In step 156, the descriptors 30, 32 is WRITTEN to the tuple-space 24 with an infinite lease request. In step 158, the process WRITEs the tail 16 back to the tuple-space 24, requesting an infinite lease. Note that this sequence of instructions results in an unlimited length queue of descriptors 30, 32.

Figure 5A:
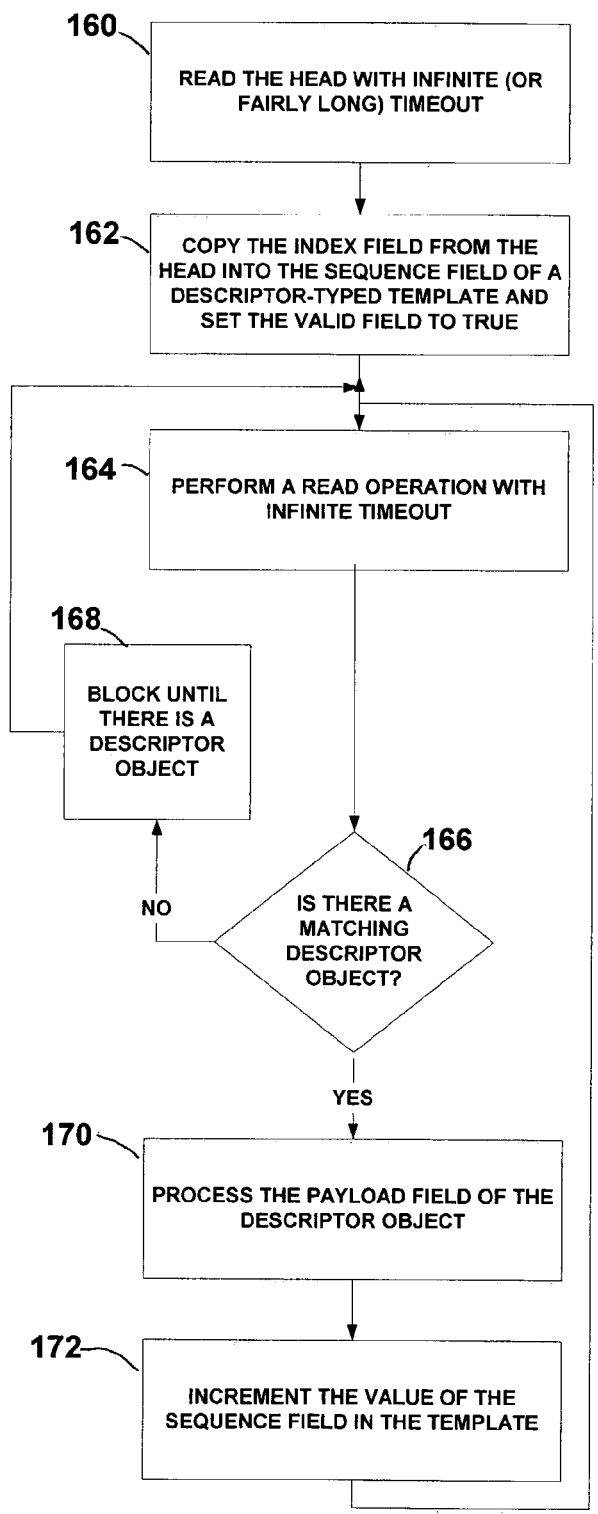
FIG. 5A is a flow diagram of the process used to READ descriptors from a virtual channel in a tuple-space according to the invention.

Referring now to FIG. 5A, the flow diagram illustrates an exemplary process for READing descriptors 30, 32 from a structure in tuple-space 24 after the descriptors are WRITTEN. This sequence of instructions executes in a separate thread, because the sequence will eventually block when all the descriptors 30, 32 have been read. Clients READ descriptors 30, 32 from the structure in a similar way as objects are read from a queue. In step 160, the client process READs the head 14 with an infinite timeout or a long timeout relative to typical system execution time. What is needed is for the READ to wait indefinitely until the head 14 associated with virtual channel 12 arrives. In one embodiment, since there is no real representation of infinity in this representation of time (there would be if, for example, time were represented as a rational number instead of as an integer), INFINITE maps to the maximum positive 64-bit integer value. This results in a very long (292 million years) timeout, which is what is required. Note that this READ will immediately complete successfully, unless a descriptor 30, 32 is in the process of being invalidated. In step 162, the client process copies the index field 126 from the head 14 into the sequence field 138 of a Descriptor-typed template and sets the valid field 140 of this template to TRUE.

In step 164, a READ operation is performed with infinite timeout using a template of the descriptor 30, 32 as described above. If it is determined, in step 166, that there is a descriptor 30, 32 in the tuple-space 24 with the specified sequence field 138 value and the valid field 140 set to TRUE, the matching descriptor 30, 32 is returned to the client, and processing continues in step 170. Otherwise, this thread of control will block until there is a matching descriptor 30, 32 in step 168 at which point processing resumes in step 164.

The process of blocking until there is a matching (i.e., matching based on content) descriptor is referred to as a blocking associative match. Note that the thread will unblock if a new descriptor 30, 32 is WRITTEN to the JavaSpace, as described in steps 152-158 (FIG. 5). In step 170, the payload field of the descriptor 30, 32 (generally including media metadata) is processed. In step 172, the value of the sequence field 138 in the template is incremented and processing resumes with a further READ operation in step 164.

Figure 6:
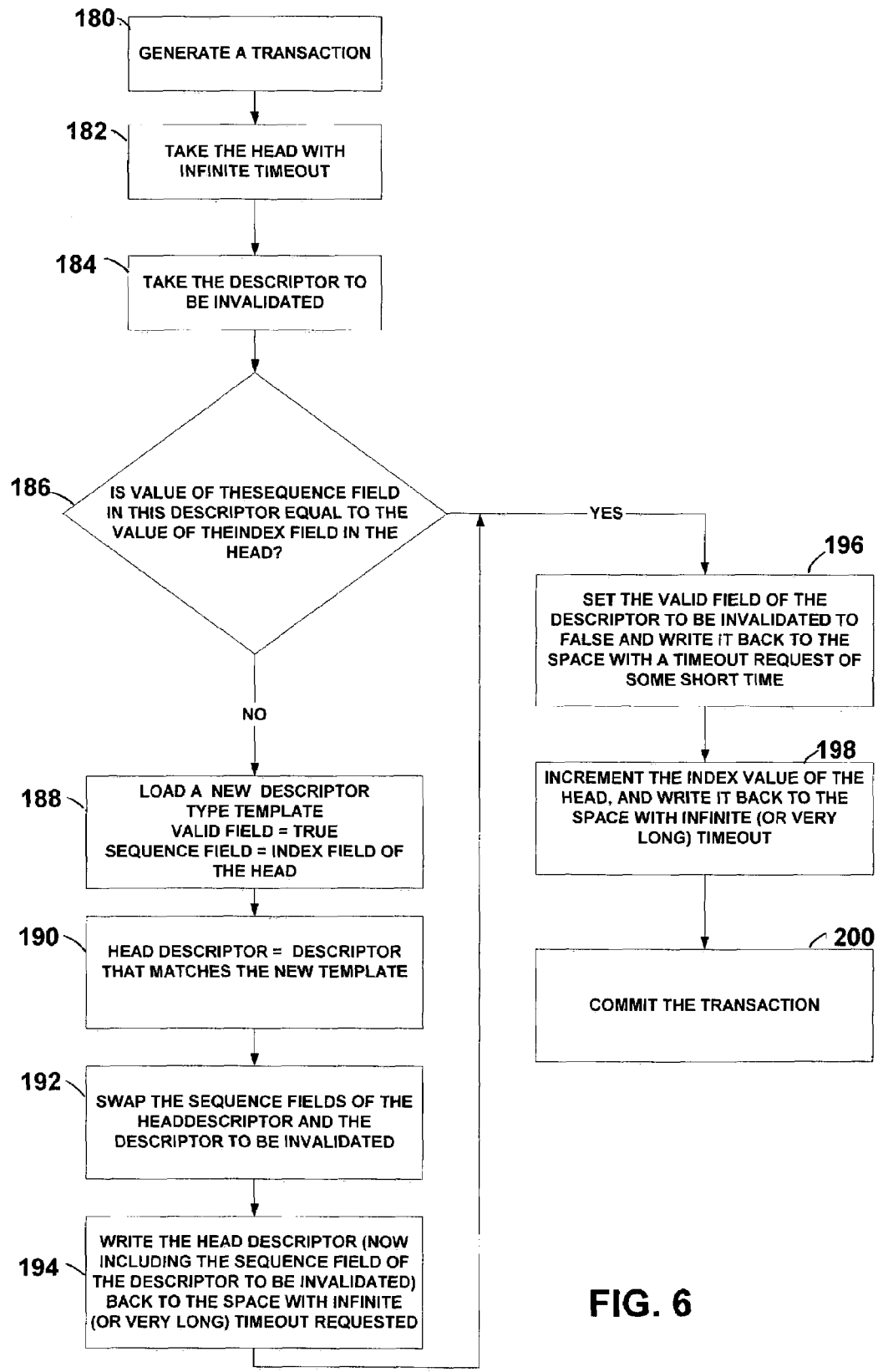
FIG. 6 is a flow diagram illustrating the steps to invalidate a descriptor used in conjunction with the descriptor distribution and invalidation protocol according to the invention.

Now referring to FIG. 6, a flow diagram illustrates the steps of invalidating a Descriptor using the Descriptor Distribution and Invalidation Protocol 36. Descriptor invalidation typically occurs when the underlying information source no longer has the described information available. One example includes a media descriptor object 32 describing a live broadcast. When the broadcast is over, the media descriptor object 32 is invalidated. Descriptor invalidation occurs in two parts: server side and client side. Descriptor invalidation on the server side typically is performed by or for a data source 20 (which knows that the underlying media is no longer valid). Each client completes the invalidation of copies of the descriptors 30, 32, previously read from the tuple-space 24, that the client retains in local memory.

Descriptor invalidation begins in step 180, where a transaction is generated. One of the problems encountered in object invalidation in a distributed system is that the object data structure, in this case the virtual channels 12, 66, will be corrupted if the processor performing the invalidation or the network coupled to that processor fails to operate correctly during the invalidation. By performing the invalidation under a transaction, either the invalidation will perform correctly (processor and network continue to run correctly) or no change in the virtual channels 12, 66 will be seen (processor or network stops running correctly), because the transaction will eventually timeout.

In step 182, the invalidation process TAKEs the head 14 with an infinite timeout. Recalling that clients READ descriptors 30, 32 from the virtual channels 12, 66 starting at the head 14 and working their way up in index, as shown in steps 160-172, step 182 causes any late arriving clients that have not yet READ the descriptors 30, 32 from the virtual channels 12, 66, to block until the transaction has completed (either through a commit, a timeout, or an abort operation).

The invalidation protocol works by swapping the invalidated descriptor 30' with the first descriptor 30, 32 in the virtual channels 12, 66, the one referenced by head 14, setting the valid flag in the invalid descriptor 30' to false, and incrementing the index value of the head 14. In step 184, the process TAKEs the descriptor 30, 32 to be invalidated. In step 186, it is determined if the value of the sequence field 138 in this descriptor 30, 32 is equal to the value of the index field 126 in the head entry 14. If the sequence field 138 and the index field 126 are equal, then the descriptor 30, 32 to be invalidated was already at the head 14, so processing continues in step 196. Otherwise, the descriptor 30,32 indicated by the head 14 is TAKEN in subsequent steps. Processing continues in step 188.

In step 188, a Descriptor-typed template is loaded (i.e., initialized) with the valid field 140 set to true, and the sequence field 138 set equal to the index field 126 of the head entry 14, and the other fields are set to null. In step 190, the process TAKEs the descriptor 30, 32 that matches the template formed in step 188, (referred to as the HeadDescriptor). In step 192, the invalidation process swaps the sequence fields 138 of the HeadDescriptor and the descriptor 30, 32 to be invalidated. In step 194, the HeadDescriptor (now including the sequence field of the descriptor 30, 32 to be invalidated) is WRITTEN back to the tuple-space 24 with infinite (or very long) lease requested.

In step 196, the process sets the valid field 140 of the descriptor 30, 32 to be invalidated to FALSE and WRITEs the descriptor 30, 32 back to the tuple-space 24 with a lease request of some short time (sufficient round-trip time for the clients and services 64 to READ, plus some margin). The descriptor 30, 32 that had been at the head 14 is now logically where the invalid descriptor 30' was in the chain, and the invalid descriptor 30' is at the head 14. In step 198, the invalidation process increments the index field 126 of the head entry 14, and WRITEs the head entry 14 back to the tuple-space 24 with an infinite (or very long) lease. Finally, in step 200, the transaction is committed.

Figure 7:
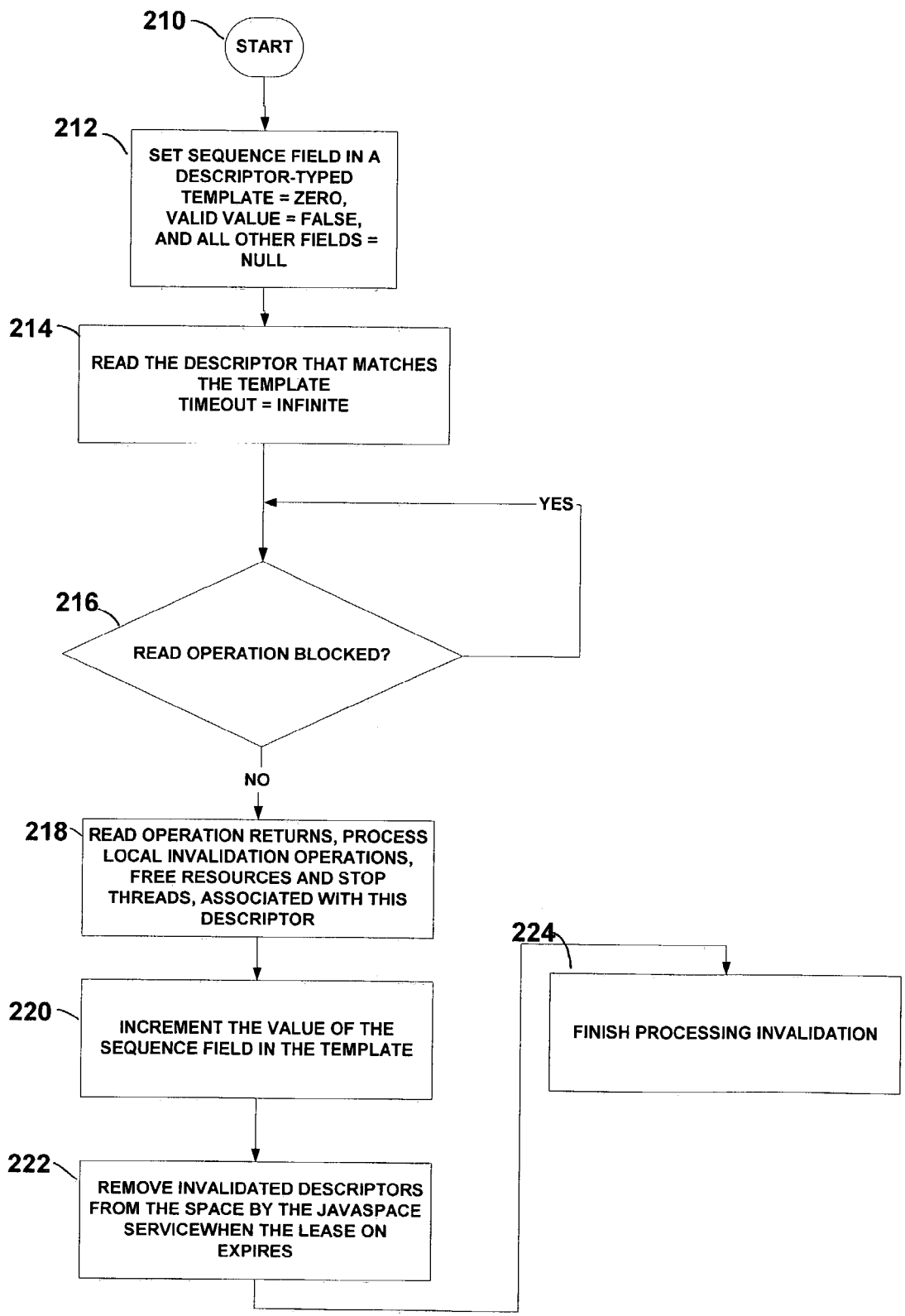
FIG. 7 is a flow diagram of the client-side process used in conjunction with the Descriptor distribution and invalidation protocol according to the invention.

Now referring to FIG. 7, a flow diagram illustrates the steps for a client process to process an invalidation. It is understood that any client or server 64 process can invalidate the descriptor 30, 32 (generally the data source 20 invalidates the descriptor 30,32), however every client that uses the descriptors 30, 32 runs the client-side invalidation process. Each client and service 64 that references the descriptors 30, 32 implements a separate thread-of-control that processes invalidations. The process commences in step 210, following which the thread-of-control sets the sequence field 138 in a Descriptor-typed template to zero, the valid field 140 to FALSE, and the other fields 142-144 to null. It should be noted that a descriptor-typed template is similar to the other templates, except for the descriptor-typed template values and the descriptor-typed template function in a READ or TAKE operation.

In step 214, it is determined whether the descriptor 30, 32 in the tuple-space 24 matches the template by performing a READ with infinite timeout. In step 216, the thread of control waits for the READ operation to finish. It should be noted that this thread-of-control will initially block on this operation most of the time, because the initial condition is that there are no invalidations. This thread will generally block even for a late arrival. If it is determined that there is a descriptor 30, 32 to be invalidated which is indicated by a successful READ operation, processing continues in step 220. Otherwise, the thread of control will continue to block in step 216 until the thread is terminated when the program exits.

In step 218, after the READ returns, local invalidation operations such as freeing resources and stopping threads, associated with this descriptor 30, 32 are processed. In step 220, the thread-of-control increments the value of the sequence field 138 in the Descriptor-typed template. In step 222, when the lease on the invalidated descriptor 30, 32 expires, it is removed from the tuple-space 24, here for example, by a JavaSpace service. The invalidation protocol 36 works because the order of the descriptor 30, 32 does not matter at the application level. The sequence field 138 is only used to assure that each client gets each descriptor 30, 32 once and only once. Most clients will get new descriptor 30, 32 soon after they arrive in the structure. Late arriving clients will see a consistent structure because they will be blocked from READING the head 14 while the head 14 has been TAKEN. Section JS.3 in the JavaSpaces™ Specification 1.1 describes the relationship of a Transaction, the low level operations and the objects in JavaSpace. The invalidation is finished in step 224.

Figure 8:
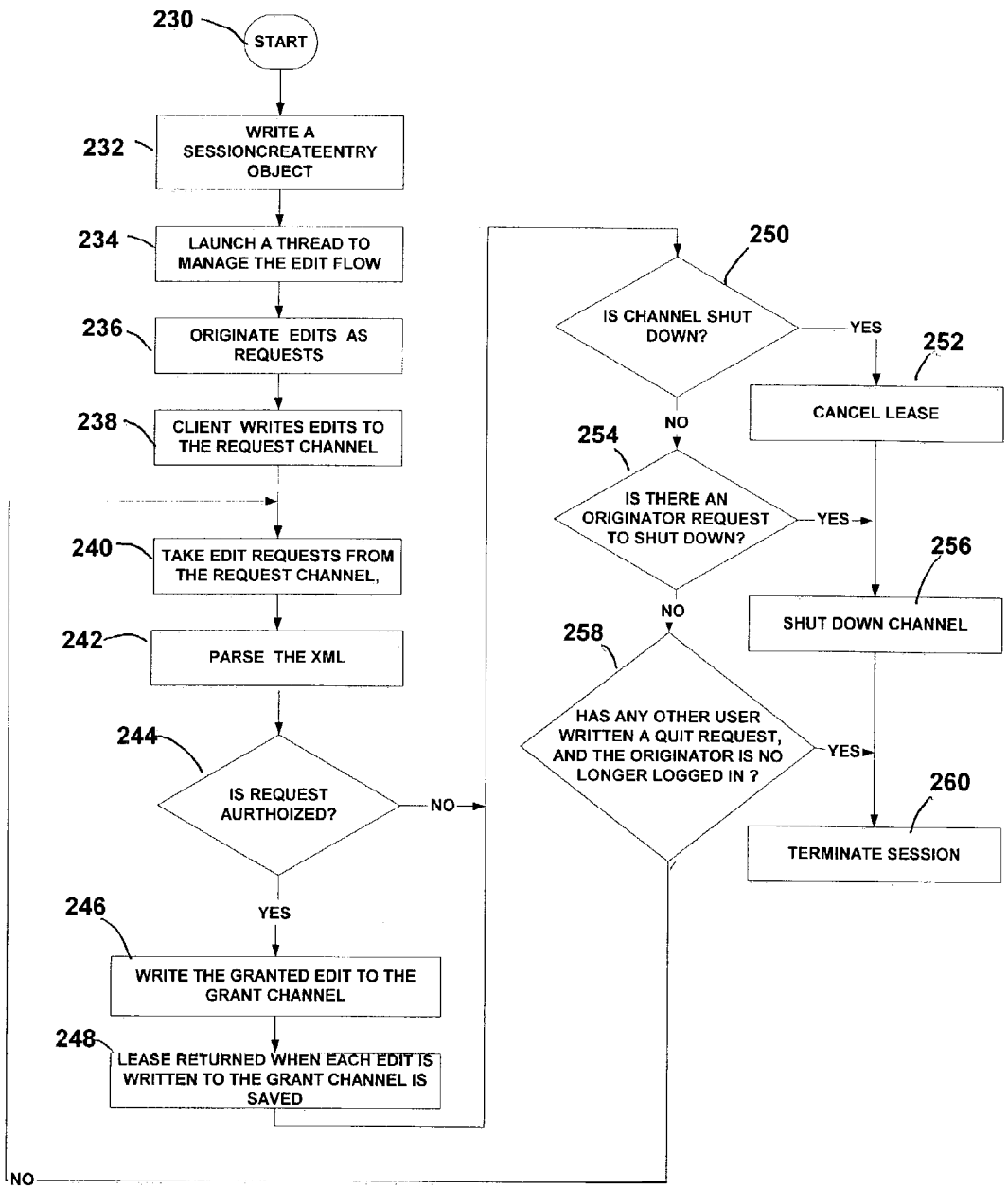
FIG. 8 is a flow diagram of the process used in conjunction with the scene graph distribution protocol according to the invention.

Now referring to FIG. 8, a flow diagram illustrates a process for distributing Scene Graph edits using a Scene Graph Distribution Protocol 38 (FIG. 1). One problem in a collaborative virtual environment (CVE) is the consistency of the models used to generate the scenes. In virtual environments, these models and the transformations required to place the models into the scene at the correct location and orientation are structured into scene graphs. The Scene Graph Distribution Protocol 38 (FIG. 1) enables segmentation of the scene graph into edits, and flowing the scene graph edits to the clients. Each scene graph edit is an instruction on how to add, delete, or modify a model or transformation in the scene graph, so that when the edits are received by a client, that client has a complete copy of the scene graph. This provides two advantages: late arriving clients can "catch up" to the current state of the shared scene graph, and changes to the scene graph, such as changes in location of an object in the scene, can be easily distributed to the clients. One requirement is that the edits be received in the correct order, which is achieved by use of the virtual channels 12, 66. The Scene Graph Distribution Protocol 38 protocol distributes scene graphs edits for CVE sessions using the tuple-space 24 to provide consistent models used to generate the scenes.

The process commences in step 230, following which CVE sessions are initiated by a client writing a Session-CreateEntry object, including the name of the session, user IDs for the invited attendees, and the user ID of the session originator to the tuple-space 24 in step 232. In step 234, an Edit Arbitration Service TAKEs these objects, generates the request channel 27 (FIG. 1) and the grant channel 28 (FIG. 1) for the edit flow, launches a thread to manage the edit flow, and WRITEs a descriptor 30, 32 to the virtual channel 12 as described in steps 150-158 (FIG. 5) The SceneGraphDescriptor is a subclass of the Descriptor class.

In step 236, Edits are originated as requests and are authorized or denied by the Edit Arbitration Service. The Edit Arbitration Service makes its decision based on the current ownership of an object, the role of the requester, and current mission context (of which there is generally only one). Edits include of group node addition, viewpoint update, transformation addition/update, object pick/drag/drop, and object delete requests and can be, for example, encoded in an Extensible Markup Language (XML). In step 238, each Client WRITEs edits to the request channel 27. In step 240, the Edit Arbitration Service TAKEs edit requests from the request channel 27, and in step 242 parses the XML. In step 244, it is determined whether to authorize the request. If the request is authorized, in step 246, the granted edit is written to the grant channel 28 and processing continues in step 248. The grant channel 28 is a virtual channel 12 that is used to flow scene graph edits to clients after edits have been authorized by the Edit Arbitration Service. Otherwise, the request is denied and processing is continued in step 250.

In step 246, the granted edit is written to a grant channel 28 for distribution to the clients. In step 248, the leases on the scene graph edits (returned by the WRITE operation) are saved in a list for periodic lease renewal. Space in the JavaSpace is leased. The WRITE and lease mechanisms are described more formally in the SUN Jini™ Technology Core Platform Specification. When a collaborative virtual environment session has been completed, the various objects including descriptors 30, 32 in the tuple-space 24 are reclaimed. In step 250, it is determined if the scene graph edit channel is to be shut down. If the channel is not shut down, processing continues in step 254, otherwise the scene graph edit leases are cancelled in step 252 and processing continues in step 256.

In step 254, it is determined if an originator is requesting to shut down the session via a quit request. It should be noted, that a quit request could be issued at any time. If a request to shut down has been issued, the session is shut down in step 256 and the session is terminated in step 260. Otherwise processing continues in step 258.

In step 258, it is determined whether any other user has WRITTEN a quit request, and the originator is no longer logged in (as described below in conjunction with the GUI Interaction Protocol of FIG. 10). If another user has WRITTEN a quit request, and the originator is logged out, the session is terminated in step 260. Otherwise, processing resumes in step 240 to process additional edit requests.

Figure 9:
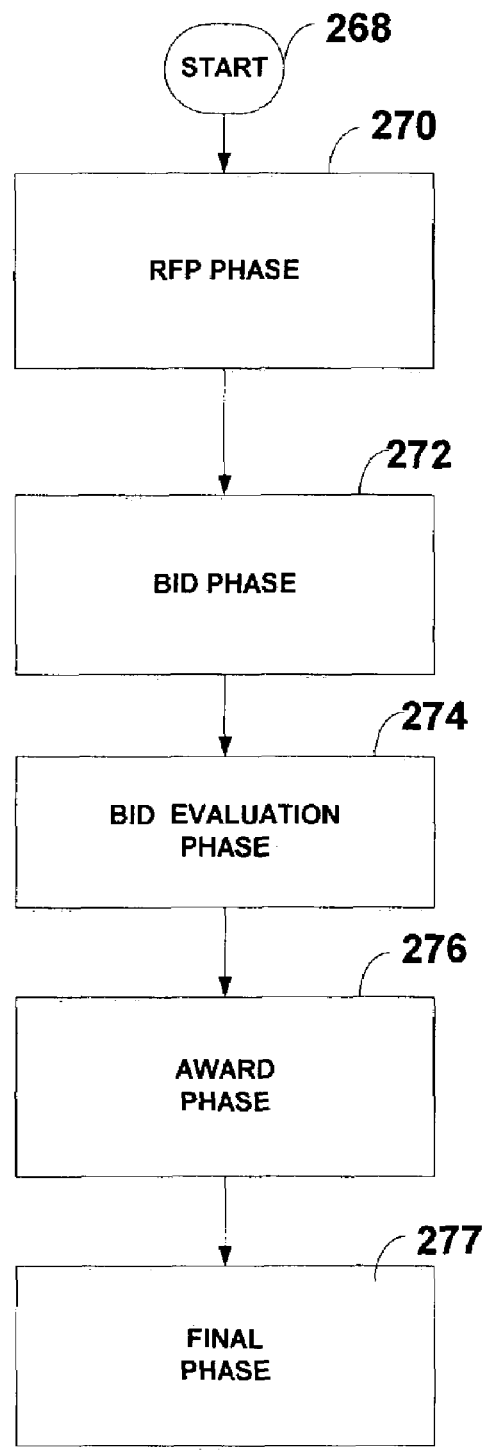
FIGS. 9-9D are flow diagrams of the process used in conjunction with the modality transformation negotiation protocol according to the invention.
Figure 9A:
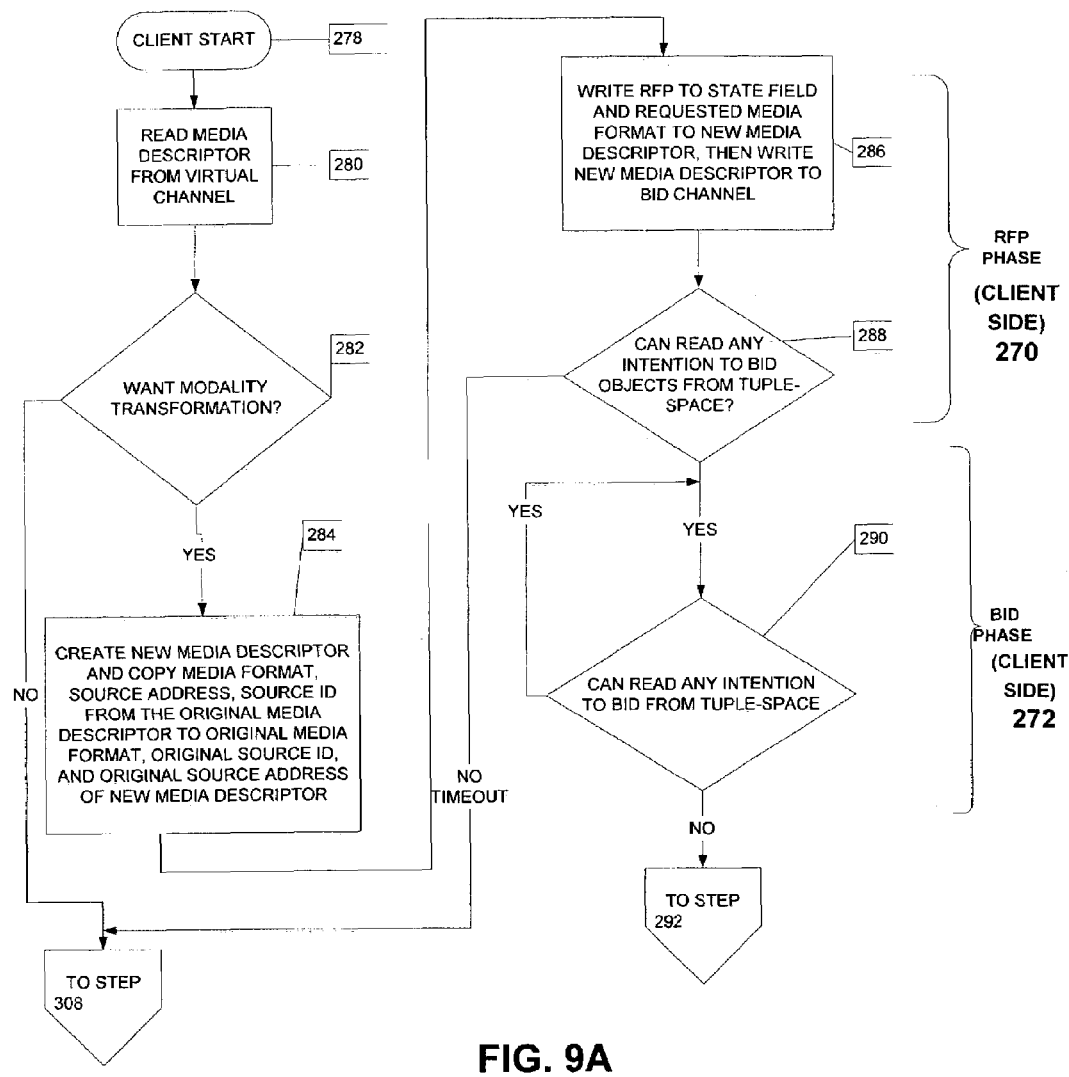
Figure 9B:
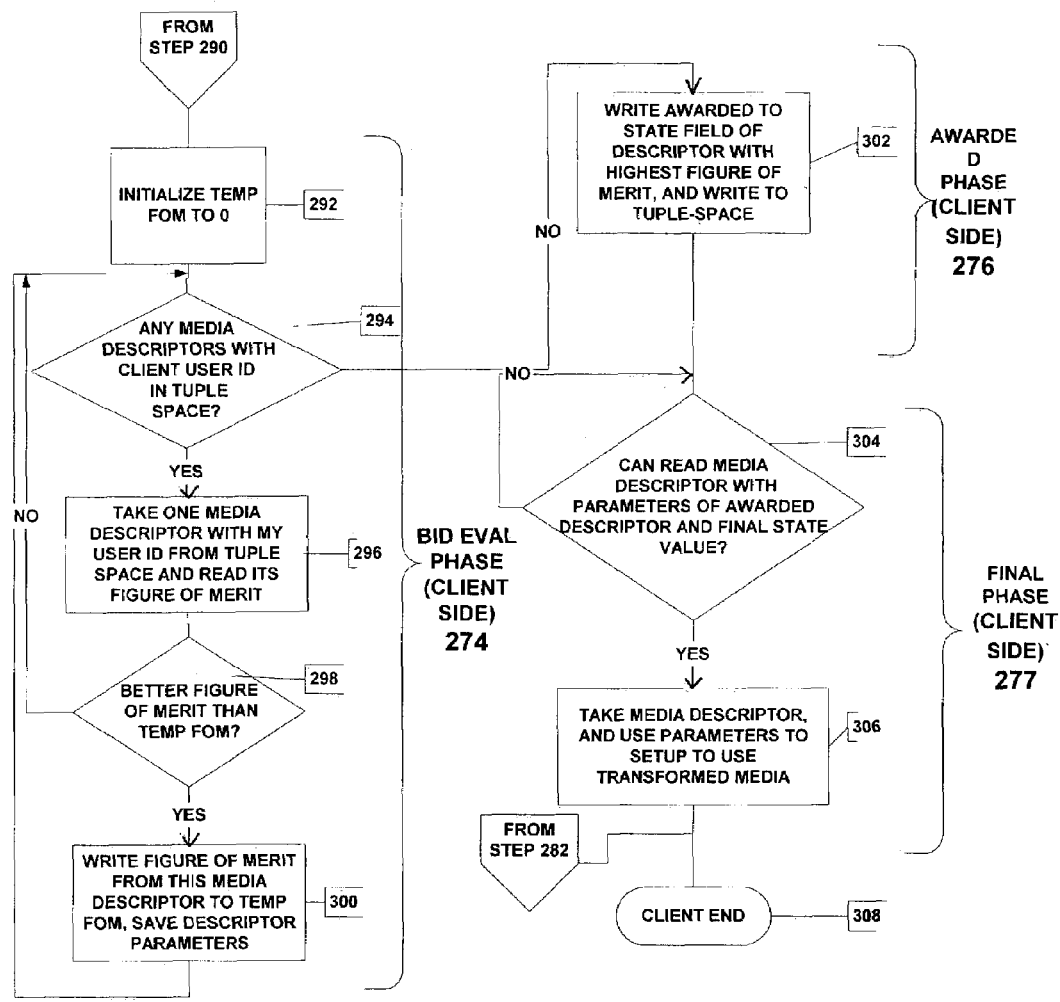
Figure 9C:
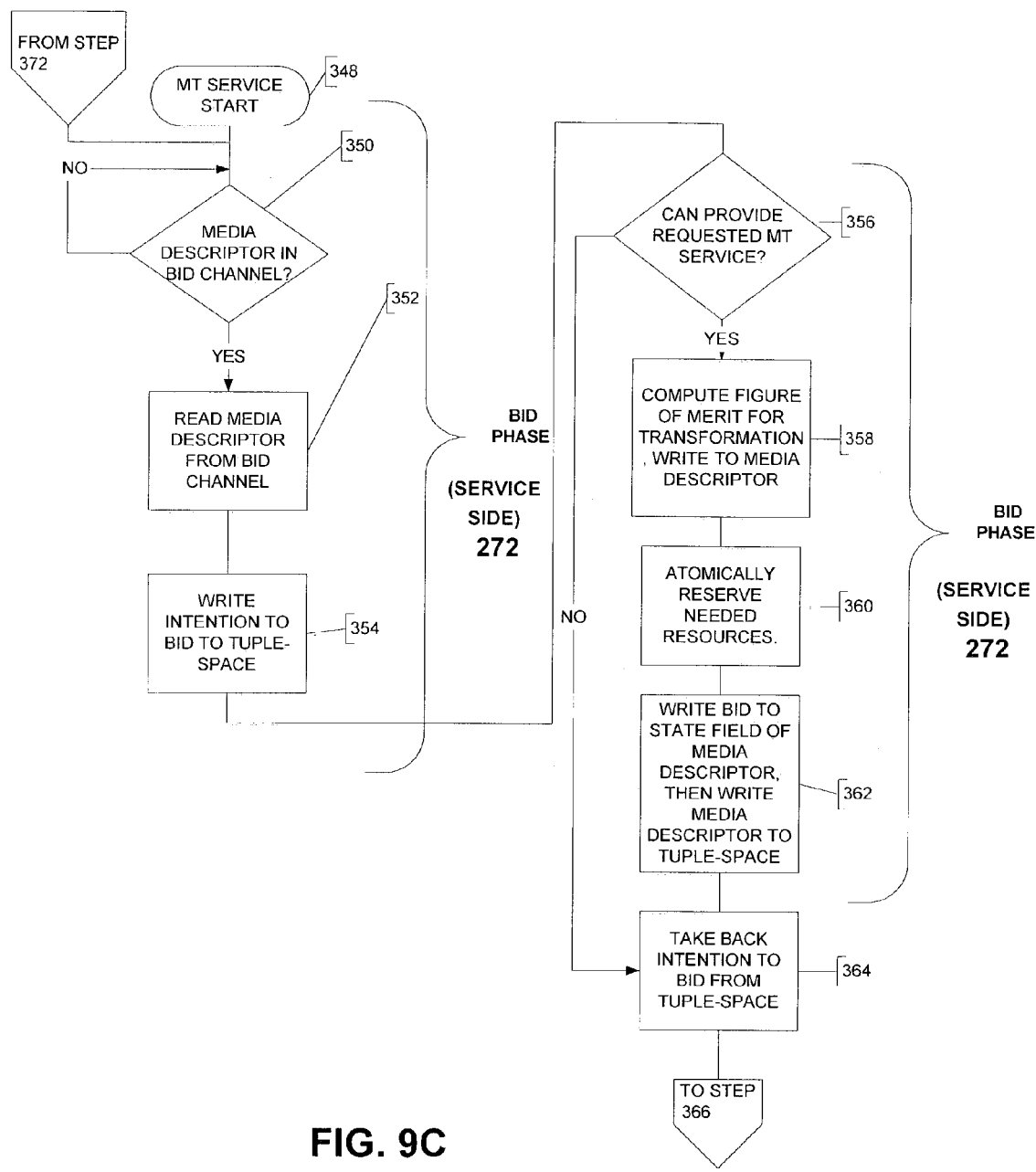
Figure 9D:
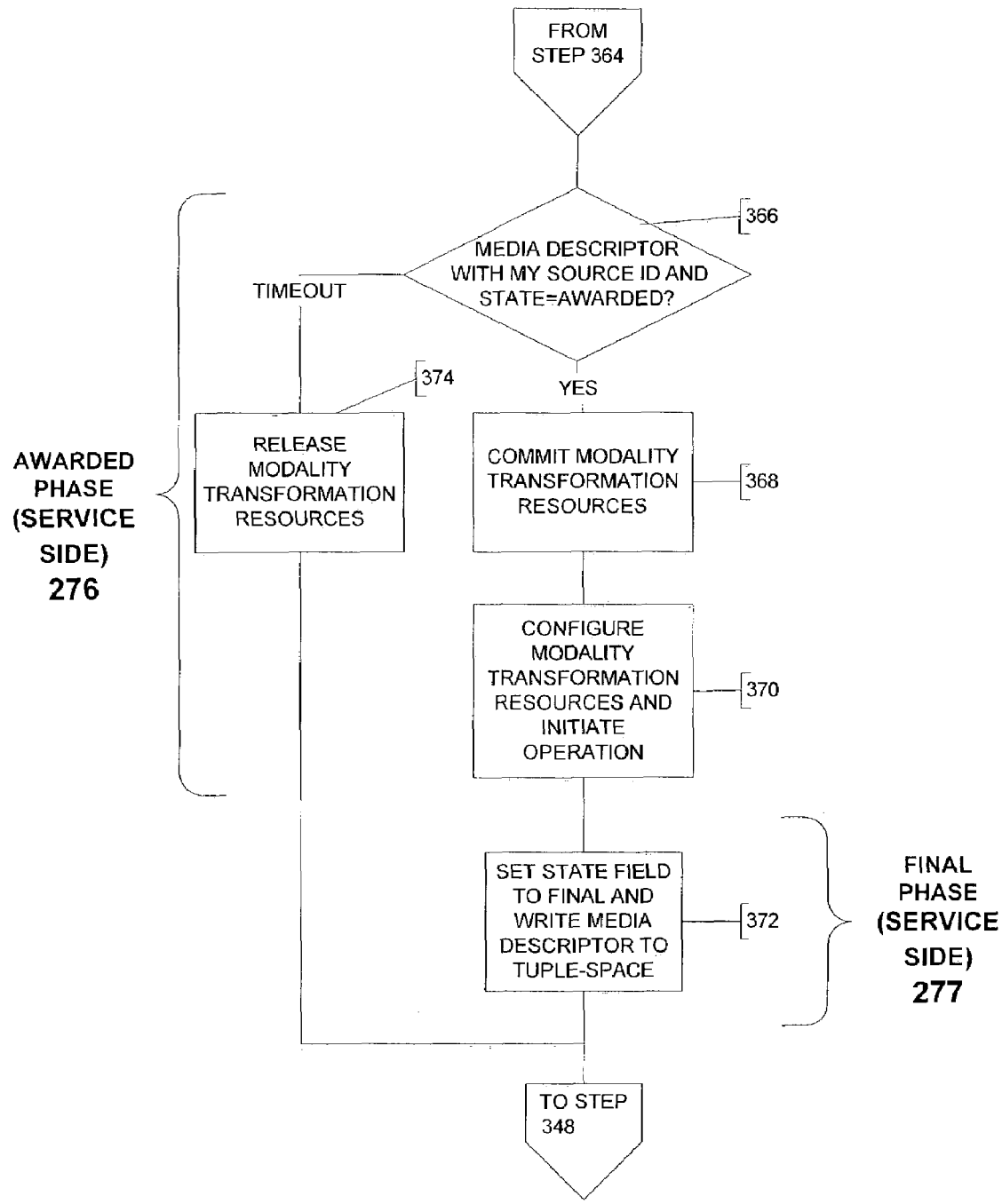

Now referring to FIGS. 9-9D, a flow diagram illustrates a process for negotiating for modality transformation services 64. The modality transformation negotiation protocol 40 includes five phases: request-for-proposal (RFP) 270, a bid phase 272, a bid evaluation phase 274, an award phase 276, and a final phase 277 (also referred to as a contract phase 277). It will be appreciated by those of ordinary skill in the art that the phases include processes which execute on the client workstations 76, the modality transformation servers 114 (FIG. 2) and the server 74 supporting the tuple-space 24. The modality transformation negotiation protocol 40 provides an efficient use of transformation services 64 by using a marketplace bidding process and by providing a fault-tolerant "anti-barrier" protocol. In shared memory multiprocessor systems, barrier synchronization is used to detect when each processor has completed a phase of parallel processing and is ready to proceed with some serialized operation. No processor leaves the barrier until all the processors have arrived. In a distributed processing system, however, one of the processors or the connecting network could fail, resulting in the processors being deadlocked, waiting for the failed node. One approach to the deadlocked situation is to use a timeout for the READ operation. This approach has the difficulty that each node has to speculate on how long to wait. The "anti-barrier" eliminates this problem by testing for the absence of an object in the space. Objects are written to the space with short lease durations, managed by the writing processes, such that failure of a node soon results in elimination of the object from the space, and processing continues when the objects have been removed by TAKEs, lease cancellations, or lease expirations.

The media descriptor objects 32a-32n (FIG. 1) include payload data 136 (FIG. 4) which includes the figure of merit 400, the media format 402, the original media format 404, the original source address 406, the original source ID 408, the required media format 410, the source address 412, the source ID 414, the state field 416, and the user ID 418. The media descriptor objects 32 are used to convey metadata about media. Clients receive media descriptor objects 32 via the descriptor distribution and invalidation protocol 36, described above in conjunction with FIGS. 5-7. If a client is not capable or the user prefers a different modality, the client attempts to fulfill the user's preference by requesting a modality transformation. The modality transformation negotiation protocol 40 is used for this purpose.

The modality transformation negotiation protocol 40 executes through the interactions of a plurality of client threads-of-control and a plurality of modality transformation service threads-of-control. The modality transformation services 64 are processes executing on transformation servers 114 (FIG. 2) that are available to perform modality transformation. The data sources 20a-20m are generally live media or recorded media streaming devices. The bid virtual channel 66 is similar in structure to the virtual channel 12.

The protocol 40 operates in five states: quiescent, request-for-proposal (RFP), bid, awarded, and final. When the system 10 is initialized, the bid virtual channel 66 is initialized to be empty, and the protocol 40 is set in the quiescent state.

Prior to modality transformation negotiation protocol 40 operation, a data source 20 provides the media descriptor object 32 to describe the characteristics of the media that it is capable of providing. The data source 20 writes a common representative name string to the name field 142 of this media descriptor object 32, a string that describes the content of the media to the description 144 field, a representation of the type of media to the media format 402 field, a string that uniquely identifies the media at that data source 20 to the source ID 414 field, and an identifier (such as an Internet URL) that points back to it as the source of the media to the source address 412 field of the media descriptor object 32. The data source 20, then WRITES this media descriptor object 32 into the virtual channel 12.

Each client, operating on behalf of the data sink 22 seeking data, reads the media descriptor object 32 from the virtual channel 12, and determines from the name field 142 and description 144 if it is desirable to display this media using the data sink 22. The media descriptor object 32 is designated the original media descriptor 33. If the client determines that the media is to be displayed, using the data sink 22, the media format 402 is assessed to determine compatibility with the modality and resource capabilities of data sink 22. If the client determines that the media, as described by the media format 402 is not appropriate for display at data sink 22, it can initiate a request for modality transformation.

Referring now to FIGS. 9A-9D, the client process commences in step 278. In step 280, the client reads a media descriptor 32 from the virtual channel 12. In step 282, it is determined (by the client) from the clients own capabilities and the parameters of the media indicated in the media descriptor object 32, whether a modality transformation is needed or desired. If the modality transformation is needed or desired, processing continues in step 284. Otherwise processing terminates in step 308.

In step 284, the new media descriptor object 32 is generated, and the parameters of the original media descriptor 33 are copied to the new media descriptor object 32, including the media format 402, source address 412, source ID 414, into the original media format 404, original source address 406, and original source ID 408, respectively. In step 286, the state field is set to RFP indicating the request for proposal state, and the desired media format is written to the required media format 410 of the new media descriptor. The new media descriptor object 32 is then written to the bid virtual channel 66, which supplies the media descriptor object 32 which the transformation services 64 are waiting for in step 350. Step 286 marks the beginning of the RFP phase 270.

The client then begins its side of the anti-barrier protocol by attempting to read an intention to bid 34 object that includes the user id 148 field equal to its own user id 148 and name 146 set to the same value as the name field 142 of the original media descriptor 33, and using a timeout of several seconds. An is unsuccessful READ (i.e., the READ times out) results in an exceptional condition indicating that no modality transformation services 64 are operating in the system. If the READ succeeds, this indicates that at least one modality transformation service is available to bid on the service. This marks the beginning of the BID phase 272. The client proceeds to poll for intention to bid objects 34 by performing READ operations with short time-out values, until it finally times out, indicating that no more intention to bid 34 objects remain (i.e., all bids are in). In other words, the client first waits for a situation where there are no intention to bid objects 34 and then some intention to bid objects 34. Then the client waits for the situation where the intention to bid objects 34 disappear.

In step 288, it is determined whether there is an intention to bid object 34. The client attempts to READ any intention to bid object 34 from the tuple-space 24, with a timeout sufficient to allow any services 64 to respond, for example, ten seconds. This step marks the start of the anti-barrier protocol. If it is determined that no transformation service 64 has written an intention to bid object 34 to the tuple-space 24 before timeout, then no modality transformation service 64 is available, and processing terminates in step 308. Otherwise, processing continues in step 290 marking the start of the Bid phase 272.

During steps 286-290, each modality transformation service 64 has been blocked and waiting for the media descriptor object 32 to appear in the bid virtual channel 66. When the client completes the WRITE to the bid virtual channel 66 in step 286, each modality transformation service 64 unblocks and reads the media descriptor object 32. Each modality transformation service 64 performs its side of the anti-barrier protocol: it generates an intention to bid object 34, copies the name field 142 from the media descriptor object 32 into the name 146 of the intention to bid object 34, copies the user id 418 field from the media descriptor object 32 into the user id 148 of the intention to bid object 34, and writes the intention to bid object 34 directly into the tuple-space 24 (i.e., not into any virtual channel 12 or bid virtual channel 66).

Now referring also to FIG. 9A, in step 290, the client detects whether the intention to bid objects 34 are absent (through removal) from the tuple-space 24. Intention to bid objects 34 are removed from the tuple-space 24 by service threads of control, in step 364 (FIG. 9C). If it is determined that no intention to bid object 34 remains in the tuple-space 24, indicating that the transformation services 64 that can bid have submitted their bids, processing continues in step 292. Otherwise processing resumes in step 290 until there are no more intention to bid objects 34.

In steps 292-304 (FIG. 9B), after the intention to bid objects 34 have been removed from the space, the client detects this condition by timing-out on the attempt to READ an intention to bid object 34. This marks the completion of the anti-barrier protocol, and indicates that the transformation services 64 that are available to bid for the transformation service have done so. The client TAKES the media descriptor objects 32 from the tuple-space 24 that have user ID 418 fields that match each client's user ID. The client selects the media descriptor object 32 with the highest figure of merit 400 field value, or by some other criteria. Alternative evaluation criteria include, but are not limited to: user priority, in which contracts may be renegotiated to provide resources for a high priority user; load balancing schemes, in which preference is given to the service that is least loaded, and cost-based schemes, in which resource cost at the service platform is considered. It is noted that these criteria may require additional data, such as user priority, server load, etc., to be conveyed in the media descriptor object 32. The client sets the state field 416 to AWARDED for this media descriptor object 32, and WRITES it back to the tuple-space 24, thereby sending confirmation to the selected modality transformation service 64.

In step 292, the client side of anti-barrier protocol and a temporary figure of merit (FOM) variable is initialized to zero. This variable is used to test for the highest figure of merit value. In general, the figure-of-merit (FOM) is a non-negative metric that is used to objectively compare the quality of two different products or processes. Here, the FOM reflects how closely the offered media format meets the requested media format. For example, if the client requests transformation of a video stream at 64 thousand bits-per-second (64K bps); and service A can deliver 128K bps and service B can deliver 256K bps, service A would receive a higher FOM for the 128K bps service.

In step 294, the tuple-space 24 is tested to detect media descriptor objects 32 with user ID 418 values equal to the client's user ID, and name field 142 values equal to the name field 142 of the original media descriptor 33. If no matching media descriptor objects 32 are found, then the media descriptor object 32 with the highest figure of merit has already been detected, and the process continues in step 302. It is possible that no available modality transformation service 64 is capable of performing the requested transformation. If a matching media descriptor object 32 was found, processing continues in step 296.

In step 296, the media descriptor object 32 detected in step 294 is TAKEN, and the figure of merit value from this media descriptor object 32 is accessed. In step 298, it is determined whether the figure of merit value from the TAKEN media descriptor object 32 is greater than the temporary FOM value. If the figure of merit is greater than the temporary FOM value, then processing continues in step 300. Otherwise, the TAKEN media descriptor object 32 is discarded, and processing continues in step 294. In step 300, the source ID 414, source address 412, and media format 402 values from this media descriptor object 32 are saved, the figure of merit value is copied to the temporary FOM variable, and the media descriptor object 32 is saved. Step 300 marks the end of the Bid Eval phase 274. Processing resumes in step 294.

In step 302, the state field 416 in the media descriptor object 32 saved in step 300 is updated to AWARDED, and the media descriptor object 32 is WRITTEN back to the tuple-space 24. Step 302 marks the start of the Award phase 276. In step 304, the tuple-space 24 is tested to see whether it includes a media descriptor 32 identical to the one written in step 302, but with the state field equal to FINAL. If the tuple-space 24 does not include a media descriptor 32 identical to the one WRITTEN in step 302, testing continues in step 304. Otherwise, processing continues in step 306. In step 306, the final, accepted media descriptor 32 is TAKEN from the tuple-space 24 with the associated parameters which have now been accepted by the client and confirmed by the service 64, and used to setup the data sink 22 to receive the transformed media. In step 308, processing terminates.

Now referring to FIG. 9C, in steps 348-364, each modality transformation service 64 determines, based on the values in the fields of the media descriptor object 32 and the computational and communication capabilities of each modality transformation service 64, whether the service 64 can perform the transformation, and if so, how well the service 64 can perform the transformation. If the service 64 can perform the transformation, the service 64 computes a figure of merit value, and sets this into the figure of merit 400 field of the media descriptor object 32. The service 64 also sets the state field 416 to BID_STATE, sets the media format it can provide to the media format 402 field, sets its source id value to the source id 414 field, and sets its source address to the source address 412 field of the media descriptor object 32a. This media descriptor object 32 is then WRITTEN directly into the tuple-space 24 (i.e., not into the bid virtual channel 66). The modality transformation service 64 then cancels the lease on its intention to bid 34, thereby removing it from the tuple-space 24. The modality transformation service 64 then attempts to READ the media descriptor object 32 from the tuple-space 24 that has its source ID in the source ID 414 field and the AWARDED value in the state field 416. This attempted READ causes this thread of control of the modality transformation service to block.

In step 348, each modality transformation service 64 is initialized. In step 350, the tuple-space 24 is tested to determine if the media descriptor object 32 exists in the bid virtual channel 66. This media descriptor object 32 is WRITTEN by the client process in step 286. If it is determined that if the media descriptor object 32 exists in the bid virtual channel 66, processing continues in step 352. Otherwise processing resumes in step 350 to wait for the media descriptor object 32 in the bid virtual channel 66. In step 352, the media descriptor object 32 is READ from the bid virtual channel 66. In step 354, the intention to bid object 34 is WRITTEN to the tuple-space 24. This entry informs the client that at least one transformation service 64 is available to perform modality transformations, and supplies the intention to bid object 34 which is READ by the client in step 288. Step 354 marks the start of the service side of the anti-barrier protocol.

In step 356, the transformation service 64 uses the parameters of the media descriptor object 32 and information about the services' own capabilities to determine if the service 64 can provide some acceptable level of service. If the modality transformation service 64 cannot provide the requested service, processing continues in step 364. If modality transformation service 64 can provide the requested service, processing continues in step 358 where the modality transformation service 64 computes a figure of merit for the transformation service it can provide, and sets this value to the figure of merit field 400 of the media descriptor 32.

In step 360, the service 64 atomically reserves needed resources, that is, it uses accesses that are mutually exclusive to accesses by other service threads of control, to reserve resources needed for the requested modality transformation. The process in step 360 can impact the computation of figure of merit in step 358 for subsequent requests for modality transformation. In step 362, the state field 416 of the media descriptor object 32 is updated to BID, and the media descriptor object 32 is WRITTEN back into the tuple-space 24. In step 364, the intention to bid object 34 WRITTEN in step 354 is TAKEN from the tuple-space 24. When the modality transformation services 64 have TAKEN back their intention to bid entries, there are no longer any intention to bid objects 34 to be READ in step 290. Step 364 marks the end of the service side operation of the anti-barrier protocol.

Now referring to FIG. 9D, in steps 366-372, each modality transformation service 64 has been blocked, waiting for the media descriptor object 32 including its source ID in the source ID 414 field and AWARDED in the state field 416. The one modality transformation service 64 that corresponds to the source ID takes the media descriptor object 32, thereby receiving confirmation that its services are selected. The selected modality transformation service 32 sets the state field 416 to FINAL, and WRITES the media descriptor object 32 back into the tuple-space 24.

The client, which has been waiting for the media descriptor including its user ID in the user ID 418 field and FINAL in the state field 416, TAKES the media descriptor object 32 from the space, and configures the target data sink to begin to receive transformed media from the selected modality transformation service 64.

In step 366, the service 64 attempts to READ the media descriptor object 32 and it is determined whether the source ID 414 and state field 416 are equal to AWARDED. If the media descriptor object 32 with the source ID 414 and state field 416 equal to AWARDED is READ before the timeout, processing continues in step 368. Otherwise, processing continues in step 374. In step 368, the resources reserved in step 360 are committed for use by the modality transformation service 64. In step 370, the modality transformation resources are configured and transformation operation is initiated.

In step 372, state field of the media descriptor is changed to FINAL, and the media descriptor object 32 is written back to the tuple-space 24. The process in step 372 supplies the media descriptor object 32 which is READ in step 304. Processing resumes in step 350 (FIG. 9C). In step 374, since each modality transformation service is waiting for the client to WRITE a media descriptor object 32 with that service's source ID value (and AWARDED in the state 416 field), the READ operation in the unselected services 64 will timeout. The modality transformation resources reserved in step 360 are released, and processing resumes in step 350 (FIG. 9C).

It will be appreciated by those of ordinary skill in the art that the bidding process is not limited to a first-come approach For example, an alternative priority based system, allows services to renegotiate with a lower-priority client (already being served by the service) to provide a lower quality-of-service to the client so that sufficient resources are available to provide service to the higher priority client.

Figure 10:
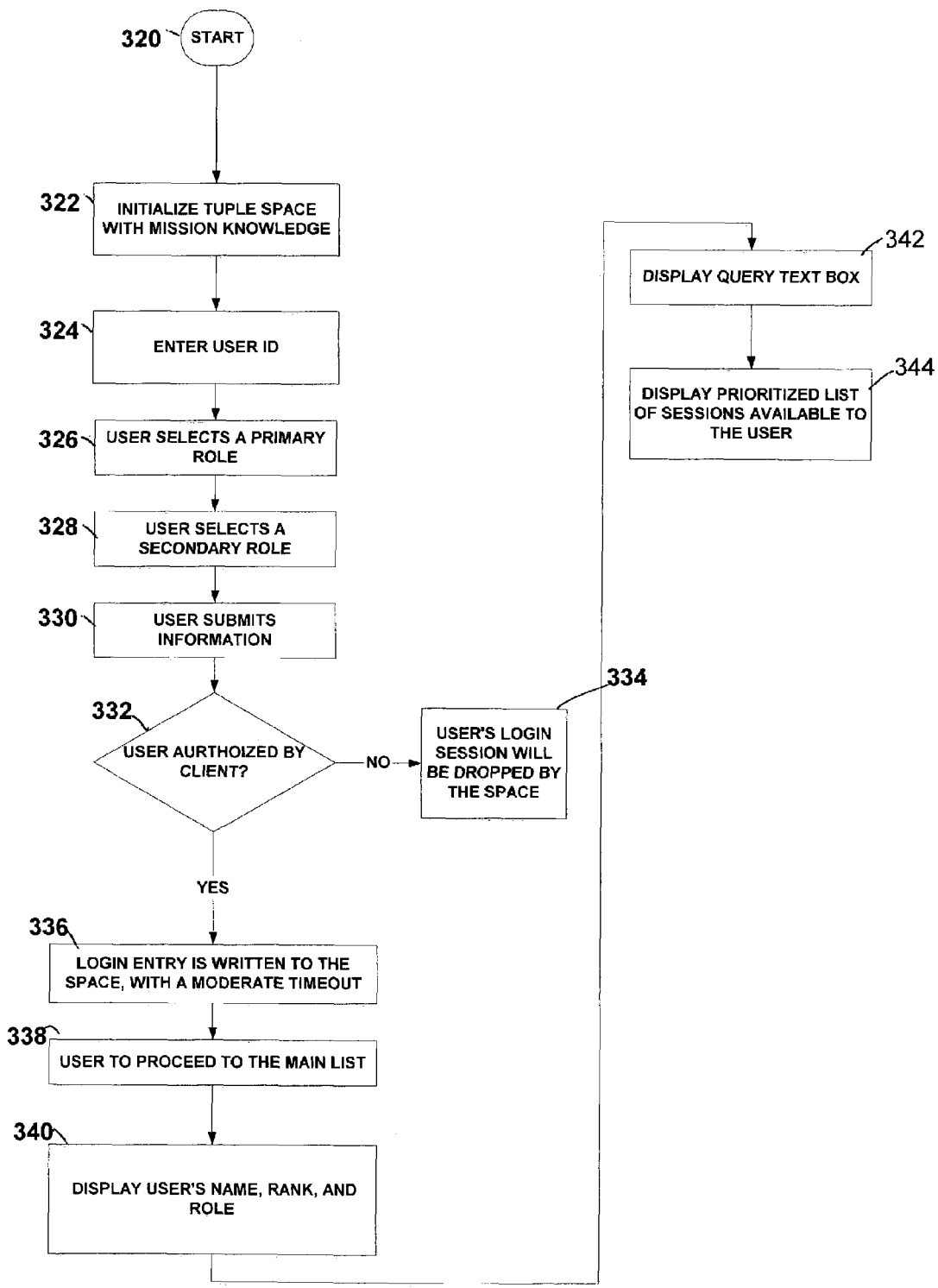
FIG. 10 is a flow diagram of the process used in conjunction with the graphical user interface (GUI) interaction protocol illustrating the steps to authorize and provide information to users according to the invention.

Now referring to FIG. 10, a flow diagram illustrates a process for a graphic user interface (GUI) interaction between users of the multimodal collaboration system and the Client computer. The goal of the GUI interaction design is to provide access to the information and collaboration sessions to each commander and staffer, while facilitating access to the information and sessions of most importance to the commander and staffer.

Prior to use by the command staff the process commences in step 320, following which the tuple-space 24 is initialized with mission knowledge in step 322. The mission knowledge includes the roles, relative precedence of roles, and type of information relevant to each role. The list of authorized users, and the mapping of users to authorized roles is WRITTEN to the tuple-space 24.

In step 324, each potential user enters a code string that is unique to the mission (e.g., for a military command center, this would be the user's military serial number) in an Enter User ID text window on a Login Panel (not shown).

In step 326, each user selects a primary role from the list (these are the roles previously loaded into the tuple-space 24). The primary role is generally the higher priority role that that user will adopt. In step 328, each user may also select a secondary role, which is a role that will be assisted by a software agent.

In step 330, the user submits information, for example by selecting a Submit button. In step 332, the client READs the authorized roles for this user from the space and it is determined whether the user is authorized by the client by comparing the authorization code with the code/role lists in the tuple-space 24. If the user is authorized, the user is allowed to proceed to the Main List and processing continues in step 336. Otherwise, the client rejects the user's login and this user's login session will be dropped by the tuple-space 24 in step 334.

In step 336, the user is authorized and the login entry 26 (FIG. 1) is WRITTEN to the tuple-space 24, with a moderate timeout, and the lease on the login entry 26 is periodically renewed. In step 338, the user proceeds to the Main List and in step 340, a workstation Client main panel (not shown) displays the user's name, rank, and role.

In step 342, a query text box is displayed, and the user can enter short queries (e.g., What is the Tokyo weather?) for evaluation by the system 10. These queries have two effects. First, if there is a session in the current list relevant to this query (determined by parsing the metadata in each media descriptor object 32), the session's priority will be boosted, and the session will move up in the list. In addition, information related to the query is sent to the Information Manager 80 (FIG. 2), which will attempt to find additional information relevant to this query and place the information into the virtual channels 12, 66.

In step 344, a prioritized list of sessions available to the user is displayed. Two types of sessions are available: media sessions and collaboration sessions. A media session will be generated if the information includes audio, video, or audio-visual media. In this case, a player is launched to play the media. If the session identifies a collaborative session, a two-dimensional (2D) or three dimensional (3D) collaborative "whiteboard" will be launched for collaboration amongst the staffers.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A distributed multimodal collaboration system comprising:
   at least one server coupled to a network;
   a plurality of data sources coupled to the network;
   a plurality of clients executing on a corresponding plurality of client workstations coupled to the network;
   a tuple-space having a plurality of media descriptors, each one of the plurality of media descriptors having a media descriptor object, the tuple-space accessible by the plurality of data sources, and the plurality of clients;
   a descriptor distribution and invalidation protocol operative to distribute and invalidate descriptors accessible by the plurality of clients and the plurality of data sources;
   a transaction service for committing a plurality of transactions associated with the descriptor distribution and invalidation protocol; and
   a plurality of modality transformation services, each one of the plurality of modality transformation services having access to the descriptors in the tuple-space and each one of the plurality of modality transformation services communicating using a modality transformation negotiation protocol to select one of the plurality of modality transformation services.

2. The system of claim 1 wherein the modality transformation negotiation protocol is implemented through communication between a plurality of data sinks, the plurality of modality transformation services, a plurality of media descriptor objects, the plurality of data sources, a plurality of intention to bid objects and a bid virtual channel.

3. The system of claim 2 wherein at least one of the plurality of modality transformation services executes on a second different server.

4. The system of claim 1 further comprising an information manager server coupled to the network.

5. The system of claim 1 wherein the modality transformation negotiation protocol includes: a request-for-proposal (RFP) phase, a bid phase, a bid evaluation phase, an award phase 276, and a final phase.

6. The system of claim 1 wherein the media descriptor object includes a payload data field comprising: a figure of merit field, a media format field, an original media format field, an original source address field, an original source ID field, a required media format field, a source address field, a source ID field, a state field, and a user ID field.

7. The system of claim 6 further comprising a process of writing to the tuple space one of the plurality of media descriptors from an original media descriptor having an original descriptor object.

8. The system of claim 1 wherein at least one of the plurality of modality transformation services bids to provide a transformation service to at least one of the plurality of clients using the modality transformation negotiation protocol.

9. The system of claim 1 wherein the modality transformation negotiation protocol comprises a fault-tolerant anti-barrier synchronization system.

10. The system of claim 1 further comprising a scene graph edit distribution protocol.

11. The system of claim 1 further comprising a graphical user interface (GUI) for presenting information prioritized for each of a plurality of users, based on of at least one of:
    a user role in the current mission;
    a user preference; and
    a user interest.

12. A distributed multimodal collaboration system comprising:
    at least one server coupled to a network having at least one modality transformation service;
    a plurality of data sources coupled to the network;
    a plurality of clients executing on a corresponding plurality of client workstations coupled to the network;
    a tuple-space having a plurality of media descriptors, each one of the plurality of media descriptors having a media descriptor object, the tuple-space distributed between the at least one server and the plurality of clients; and
    a modality transformation negotiation protocol operative among the at least one modality transformation service and the plurality of clients to select the at least one modality transformation service having a selected one of the plurality of media descriptors.

* * * * *

UNITED STATES PATENT AND TRADEMARK OFFICE
CERTIFICATE OF CORRECTION

| | |
|---|---|
| PATENT NO. | : 7,269,623 B2 |
| APPLICATION NO. | : 10/339265 |
| DATED | : September 11, 2007 |
| INVENTOR(S) | : Neely et al. |

It is certified that error appears in the above-identified patent and that said Letters Patent is hereby corrected as shown below:

Col. 2, line 5, delete "session," and replace with --session--.

Col. 2, line 59, delete "system a" and replace with --system, a--.

Col. 3, line 11, delete ", a tuple-space" and replace with --, and a tuple-space--.

Col. 3, line 66, delete "Descriptor" and replace with --descriptor--.

Col. 6, line 57, delete "descriptors" and replace with --descriptor--.

Col. 7, line 14-15, delete "graphical user interface" and replace with --Graphical User Interface--.

Col. 8, line 49, delete "though" and replace with --through--.

Col. 10, line 1, delete "clients" and replace with --client--.

Col. 10, line 28, delete "102, and the" and replace with --102, the--.

Col. 10, line 32, delete "clients" and replace with --client--.

Col. 10, line 55, delete "WorkStation Client." and replace with --WorkStationClient.--.

Col. 10, line 56, delete "WorkStation Client." and replace with --WorkStationClient.--.

Col. 13, line 27, delete "descriptor 30, 32" and replace with --descriptors 30, 32--.

Col. 13, line 60, delete "descriptor 30, 32" and replace with --descriptors 30, 32--.

Col. 13, line 64, delete "descriptor 30, 32" and replace with --descriptors 30, 32--.

Col. 14, line 6, delete "descriptor 30, 32" and replace with --descriptors 30, 32--.

Col. 14, line 47, delete "descriptor 30, 32" and replace with --descriptors 30, 32--.

Col. 14, line 51, delete "descriptor 30, 32" and replace with --descriptors 30, 32--.

Col. 14, line 55, delete "descriptor 30, 32" and replace with --descriptors 30, 32--.

UNITED STATES PATENT AND TRADEMARK OFFICE
CERTIFICATE OF CORRECTION

PATENT NO.        : 7,269,623 B2
APPLICATION NO.   : 10/339265
DATED             : September 11, 2007
INVENTOR(S)       : Neely et al.

It is certified that error appears in the above-identified patent and that said Letters Patent is hereby corrected as shown below:

Col. 14, line 56, delete "was" and replace with --were--.

Col. 14, line 57, delete "descriptor 30, 32" and replace with --descriptors 30, 32--.

Col. 14, line 64, delete "descriptor 30, 32" and replace with --descriptors 30, 32--.

Col. 14-15, line 67-1, delete "descriptor 30, 32" and replace with --descriptors 30, 32--.

Col. 15, line 2, delete "descriptor 30, 32" and replace with --descriptors 30, 32--.

Col. 15, line 6, delete "descriptor 30, 32" and replace with --descriptors 30, 32--.

Col. 15, line 7, delete "descriptor 30, 32" and replace with --descriptors 30, 32--.

Col. 15, line 10, delete "descriptor 30, 32" and replace with --descriptors 30, 32--.

Col. 15, line 21, delete "descriptor 30, 32)," and replace with --descriptors 30, 32),--.

Col. 15, line 33, delete "descriptor 30, 32" and replace with --descriptors 30, 32--.

Col. 15, line 48, delete "this descriptor 30, 32" and replace with -- the descriptors 30, 32--.

Col. 15, line 51, delete "descriptor 30, 32" and replace with --descriptors 30, 32--.

Col. 15, line 54, delete "descriptor 30, 32" and replace with --descriptors 30, 32--.

Col. 15, line 57-58, delete "descriptor 30, 32" and replace with --descriptors 30, 32--.

Col. 16, line 32, delete "(FIG. 5) The" and replace with --(FIG. 5). The--.

Col. 16, line 39, delete "include of group" and replace with --include a group--.

Col. 18, line 36, delete "clients" and replace with --client's--.

Col. 18, line 57, delete "intention to bid 34 object" and replace with --intention to bid object 34--.

Col. 18, line 61, delete "An is unsuccessful" and replace with --An unsuccessful--.

UNITED STATES PATENT AND TRADEMARK OFFICE
CERTIFICATE OF CORRECTION

PATENT NO.        : 7,269,623 B2
APPLICATION NO.   : 10/339265
DATED             : September 11, 2007
INVENTOR(S)       : Neely et al.

It is certified that error appears in the above-identified patent and that said Letters Patent is hereby corrected as shown below:

Col. 20, line 10, delete "(64 K bps);" and replace with --(64 Kbps),--.

Col. 21, line 5, delete "intention to bid 34," and replace with --intention to bid object 34,--.

Col. 21, line 45, delete "of figure" and replace with --of a figure--.

Col. 22, line 30, delete "approach For" and replace with --approach. For--.

Col. 22, line 43, delete "staff the" and replace with --staff, the--.

Col. 22, line 58, delete "that that user" and replace with --that the user--.

Col. 24, line 40, delete "on of at least" and replace with --on at least--.

Signed and Sealed this

Seventeenth Day of February, 2009

JOHN DOLL
*Acting Director of the United States Patent and Trademark Office*